US012346037B2

(12) United States Patent
Tanaka et al.

(10) Patent No.: US 12,346,037 B2
(45) Date of Patent: Jul. 1, 2025

(54) IMAGE FORMING APPARATUS

(71) Applicant: CANON KABUSHIKI KAISHA, Tokyo (JP)

(72) Inventors: Hiroki Tanaka, Kanagawa (JP); Naoya Sawamura, Kanagawa (JP); Akihisa Matsukawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/612,419

(22) Filed: Mar. 21, 2024

(65) Prior Publication Data

US 2024/0241464 A1 Jul. 18, 2024

Related U.S. Application Data

(63) Continuation of application No. PCT/JP2022/036697, filed on Sep. 30, 2022.

(30) Foreign Application Priority Data

Oct. 7, 2021 (JP) ................................ 2021-165724
Aug. 10, 2022 (JP) ................................ 2022-127522

(51) Int. Cl.
*G03G 15/02* (2006.01)
*G03G 5/087* (2006.01)
(Continued)

(52) U.S. Cl.
CPC ..... *G03G 15/0266* (2013.01); *G03G 15/0216* (2013.01); *G03G 15/0233* (2013.01);
(Continued)

(58) Field of Classification Search
CPC ........... G03G 15/0266; G03G 15/0216; G03G 15/0233; G03G 15/025; G03G 15/751;
(Continued)

(56) References Cited

U.S. PATENT DOCUMENTS

2004/0136749 A1* 7/2004 Kinoshita .......... G03G 15/0216 399/129
2014/0363182 A1* 12/2014 Yoshida ............ G03G 15/0283 399/50
2017/0075248 A1* 3/2017 Tokudome ............ G03G 21/08

FOREIGN PATENT DOCUMENTS

JP H075748 B2 1/1995
JP H09269709 A 10/1997
(Continued)

*Primary Examiner* — Joseph S Wong
(74) *Attorney, Agent, or Firm* — Canon U.S.A., Inc. IP Division

(57) ABSTRACT

An image forming apparatus includes a photosensitive drum, first and second charging members, a development member, and first and second charging voltage applying units. The photosensitive drum includes a surface layer constituting a surface of the photosensitive drum. The second charging voltage applying unit applies a second charging voltage to the second charging member. The surface layer of the photosensitive drum has a volume resistivity of 1.0×109 ohm centimeters (Ω·cm) or more and 1.0×1014 Ω·cm or less. The second charging voltage applying unit applies the second charging voltage such that a second potential difference formed between the second charging member and the surface of the photosensitive drum charged by the first charging member is equal to or higher than a discharge starting voltage.

20 Claims, 12 Drawing Sheets

(51) Int. Cl.
*G03G 15/00* (2006.01)
*G03G 21/00* (2006.01)

(52) U.S. Cl.
CPC ......... *G03G 15/025* (2013.01); *G03G 15/751* (2013.01); *G03G 21/0011* (2013.01); *G03G 21/0064* (2013.01); *G03G 5/087* (2013.01)

(58) Field of Classification Search
CPC . G03G 21/0011; G03G 21/0064; G03G 5/087
See application file for complete search history.

(56) References Cited

FOREIGN PATENT DOCUMENTS

| | | | |
|---|---|---|---|
| JP | 2004219855 | A | 8/2004 |
| JP | 2005017383 | A | 1/2005 |
| JP | 2006259197 | A | 9/2006 |
| JP | 2010122635 | A | 6/2010 |
| JP | 2012194584 | A | 10/2012 |
| JP | 2021067946 | A | 4/2021 |

* cited by examiner

IMAGE FORMING APPARATUS

CROSS-REFERENCE TO RELATED APPLICATIONS

This application is a Continuation of International Patent Application No. PCT/JP2022/036697, filed Sep. 30, 2022, which claims the benefit of Japanese Patent Application No. 2021-165724, filed Oct. 7, 2021 and Japanese Patent Application No. 2022-127522, filed Aug. 10, 2022, all of which are hereby incorporated by reference herein in their entirety.

TECHNICAL FIELD

The present invention relates to an image forming apparatus, such as a laser printer, a copy machine, or a fax machine, that employs an electrophotographic recording system.

BACKGROUND ART

Traditionally, an image forming apparatus that employs an electrophotographic system or an electrostatic recording system has used a corona charger as a charging unit for a photosensitive drum such as an electrophotographic photoreceptor or an electrostatic recording dielectric body. In recent years, due to advantages such as low ozone and low power, an apparatus that employs a contact-charging system that charges a photosensitive drum by bringing a voltage-applied charging member into contact with the photosensitive drum has been put into practice.

In particular, a roller charging system that uses a charging roller as a charging member is favored from the viewpoint of charging stability. A contact charger that employs a roller charging system charges a photosensitive drum by bringing an intermediate-resistance elastic roller serving as a charging member into pressure-contact with a photosensitive drum and applying a voltage thereto. Specifically, since charging is carried out by discharging an electric current from the charging member to the photosensitive drum, charging starts according to the Paschen's law by applying a voltage equal to or higher than a particular threshold voltage.

For example, when a charging process is carried out by bringing a charging roller into pressure-contact with an OPC photoreceptor that has a 25 μm-thick photosensitive layer and serves as a photosensitive drum, the surface potential of the photoreceptor starts to rise by applying a voltage equal to or higher than about 550 V to the charging roller, as illustrated in FIG. 5. From then on, the surface potential of the photoreceptor rises linearly with a slope of 1 relative to the applied voltage. This threshold voltage is hereinafter defined as the charge starting voltage Vth.

In other words, in order to obtain a dark potential Vd, which is the surface potential of the photoreceptor needed for electrophotography, a DC voltage equal to or higher than Vd+Vth is needed for the charging roller. Such a contact charging system that charges the photosensitive drum by applying only a DC voltage to the contact charging member is referred to as "contact DC charging system".

The contact DC charging system can decrease ozone-containing discharge products compared to the corona charging system; however, its primary charging mechanism involves a discharge phenomenon from the charging member to the photosensitive drum, and thus minute amounts of discharge products are generated as a result of discharging. Moreover, the discharge phenomenon modifies the surface of the photosensitive drum. The discharge products and the modified photosensitive drum surface undergo a decrease in resistance particularly in a high-temperature, high-humidity environment; thus a surface potential necessary for image formation is not formed on the photosensitive drum, and it may be difficult to develop the desired image by using a development roller.

To address this issue, it has been common practice to simultaneously scrape off the discharge products and the modified photosensitive drum surface by continuing to print while gradually scraping off the modified photosensitive drum surface and the discharge products on the photosensitive drum surface. Specifically, the photosensitive drum surface is scraped off with a charging member, a development roller, or a cleaning blade that removes a developer remaining on the surface of the photosensitive drum and that is disposed in contact with the photosensitive drum. However, the lifetime of the photosensitive drum has become longer in recent years, and it has become difficult to keep scraping off the photosensitive drum surface throughout its lifetime.

To address this issue, PTL 1 discloses a charging system that does not involve the discharge phenomenon as the measures for addressing the modification of the photosensitive drum surface and the discharge products without having to resort to scraping of the photosensitive drum surface. PTL 1 proposes a system in which a charge injection layer is disposed on the outermost surface of the photosensitive drum, and the photosensitive drum is charged by directly injecting charges from a charging brush.

According to this structure, unlike charging that involves discharging, the charging member directly makes ohmic contact with the photosensitive drum and injects charges; thus, generation of discharge products and modification of the photosensitive drum surface caused by discharging can be reduced.

However, PTL 1 had following issues. According to the structure disclosed in PTL 1, only the portion where the charging member is in direct contact with the photosensitive drum is chargeable, and thus, to prevent microscopic charging failure, the charging brush roller must be brought into contact with the photosensitive drum at a particular pressure. Additionally, the contact points are increased by rotating the charging brush roller in a direction opposite to the photosensitive drum rotation direction at a double speed. In some cases, this has caused charging failure due to scratches on the surface of the photosensitive drum and detachment of a conductive coat of the charging brush of the charging brush roller, and has caused insufficient charge injection at a portion where the un-transferred developer remaining on the photosensitive drum adheres to the charging brush roller.

SUMMARY

Thus, an object of the present invention is to reduce charging nonuniformity while reducing generation of discharge products and modification of the photosensitive drum surface caused by discharging in a charging structure that involves direct charge injection into the surface of the photosensitive drum.

CITATION LIST

Patent Literature

PTL 1 Japanese Patent Laid-Open No. 7-5748

In view of the above, the present invention includes a photosensitive drum that is rotatable and includes a support and a surface layer constituting a surface; a first charging member that forms a first charging portion by coming into contact with the surface of the photosensitive drum and that charges the surface of the photosensitive drum in the first charging portion; a development member that supplies a developer to the surface of the photosensitive drum in a facing portion where the development member faces the surface of the photosensitive drum; a second charging member that charges the surface of the photosensitive drum, which has been charged by the first charging member, in a second charging portion where the second charging member faces the surface of the photosensitive drum, the second charging portion being located downstream of the first charging portion and upstream of the facing portion in a rotation direction of the photosensitive drum; a first charging voltage applying unit that applies a first charging voltage to the first charging member; a second charging voltage applying unit that applies a second charging voltage to the second charging member; and a control unit that controls the first charging voltage applying unit and the second charging voltage applying unit, in which the surface layer of the photosensitive drum has a volume resistivity of $1.0\times10^{9}$ $\Omega\cdot$cm or more and $1.0\times10^{14}$ $\Omega\cdot$cm or less, and the control unit controls the second charging voltage applied to the second charging voltage applying unit such that a second potential difference formed between the second charging member and the surface of the photosensitive drum charged by the first charging member is equal to or higher than a discharge starting voltage.

Further features of the present invention will become apparent from the following description of exemplary embodiments with reference to the attached drawings.

DESCRIPTION OF EMBODIMENTS

Figure 1A:
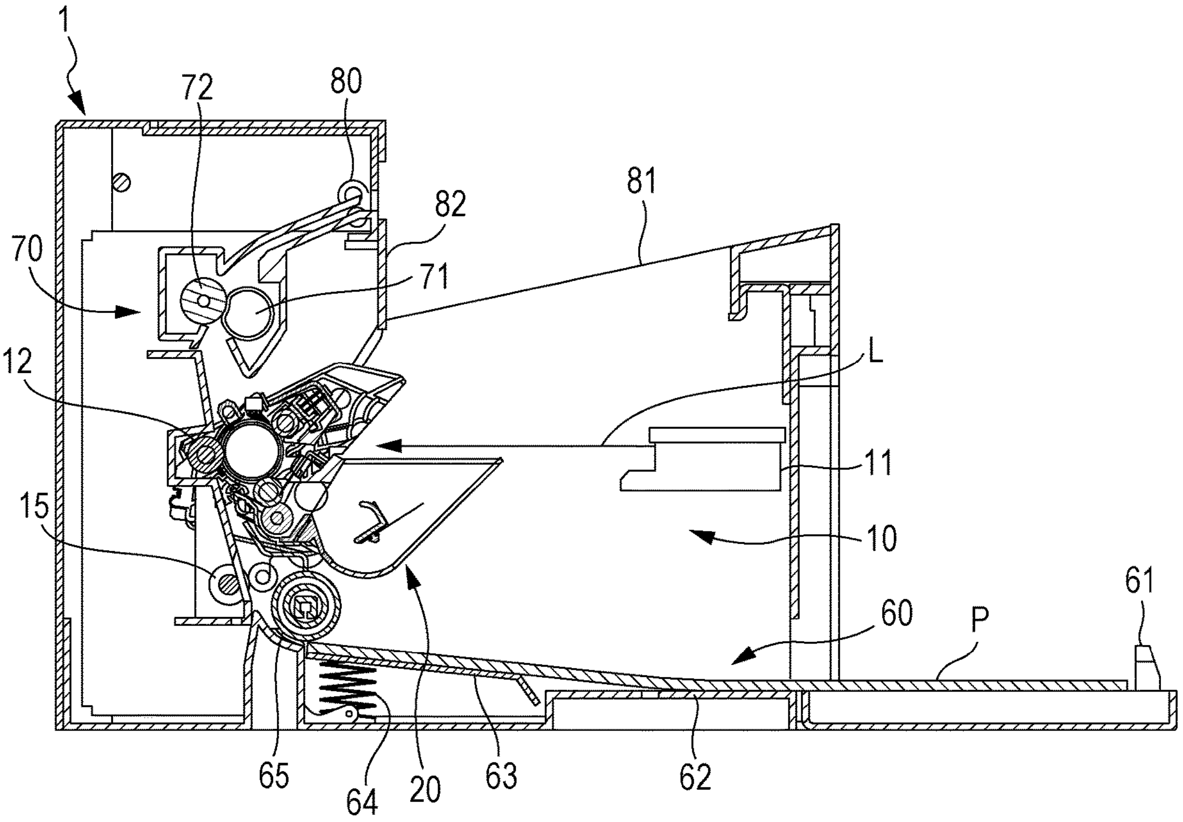
FIG. 1A is a schematic cross-sectional view of an image forming apparatus and a process cartridge according to embodiment 1.

Embodiments for implementing the present invention will now be described in detail through exemplary embodiments by referring to the drawings. It should be noted that the dimensions, materials, shapes, relative positions, etc., of the constituent parts disclosed in these embodiments are subject to appropriate modifications and alterations depending on the structure of the apparatus to which the invention is applied and various conditions. In other words, the scope of the present invention is not intended to be limited to those of the embodiments described below.

Embodiment 1

1. Image Forming Apparatus

Figure 1B:
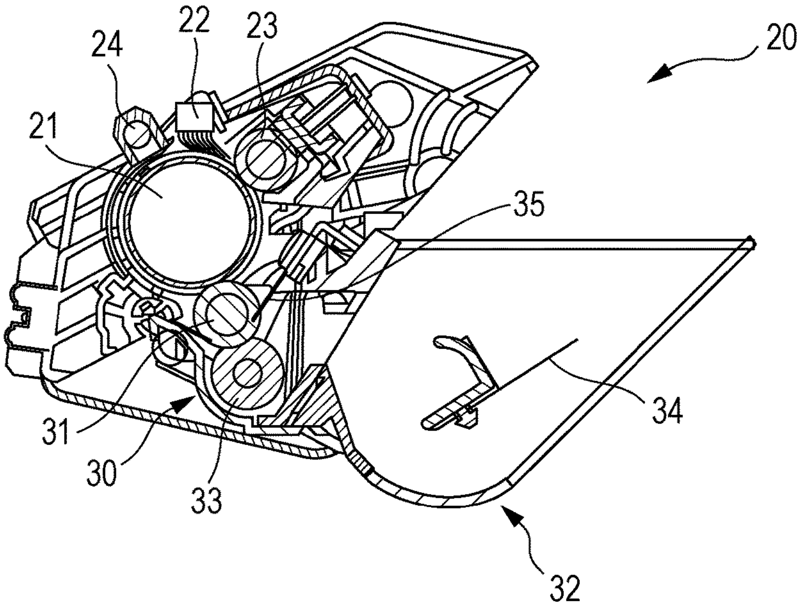
FIG. 1B is a schematic cross-sectional view of the process cartridge according to embodiment 1.

FIGS. 1A and 1B are schematic views illustrating the structure of an image forming apparatus 1 according to Embodiment 1. The image forming apparatus 1 is a monochrome printer that forms an image on a recording material on the basis of image information input from an external device. Examples of the recording material include paper such as regular paper and heavy paper, plastic films such as sheets for overhead projectors, specially shaped sheets such as envelops and index paper, and various sheet materials of different materials, such as cloths.

As illustrated in FIG. 1A, the image forming apparatus 1 includes an image forming unit 10 that forms a toner image on a recording material P. The image forming apparatus 1 also includes a feeder 60 that feeds the recording material P to the image forming unit 10, a fixing unit 70 that fixes the toner image, which has been formed by the image forming unit 10, onto the recording material P, and an ejection roller pair 80.

The image forming unit 10 includes a scanner unit 11, an electrophotographic process cartridge 20, and a transfer roller 12 that transfers a toner image, which has been formed on a photosensitive drum 21 of the process cartridge 20, onto the recording material P. The process cartridge 20 is shown in detail in FIG. 1B. The process cartridge 20 includes the photosensitive drum 21, and the following components arranged around the photosensitive drum 21: a charging brush 22, a charging roller 23, a pre-exposure device 24, and a development device 30 including a development roller 31.

The photosensitive drum 21 is a cylindrically formed photoreceptor and the outermost surface thereof has a charge injecting function. The photosensitive drum 21 serving as an image support is rotationally driven by a motor (not illustrated) in a particular direction (in a clockwise direction in FIG. 1B) at a particular process speed.

The image forming apparatus of this embodiment offers a printing speed of 30 sheets per minute when A4 size paper sheets are continuously fed, and the circumferential surface of the photosensitive drum 21 rotates at 170 mm/second.

The charging brush 22 and the charging roller 23 contact the photosensitive drum 21 at a particular contact force, and desired charging voltages are respectively applied thereto from two charging high-voltage power supplies (first charging voltage applying unit E4 and a second charging voltage applying unit E1) that output different voltages. Here, the first charging voltage applying unit E4 is a brush voltage applying unit (brush power supply) that applies a first charging voltage to the charging brush 22, and the second charging voltage applying unit E1 is a roller voltage applying unit (charging power supply) that applies a second charging voltage to the charging roller 23. By applying the voltages thereto, the surface of the photosensitive drum 21 is uniformly charged at a particular potential. In this embodiment, the photosensitive drum 21 is negatively charged by the charging brush 22 and the charging roller 23. The pre-exposure device 24 erases the surface potential of the photosensitive drum 21 before entry to a charging portion in order to stably carry out charging by the charging brush 22 and the charging roller 23. In this embodiment, the charging brush 22 charges the photosensitive drum 21 mainly by direct charge injection, and the charging roller 23 charges the photosensitive drum 21 mainly by discharging.

Note that charging of the photosensitive drum 21 by using the charging brush 22 and the charging roller 23 is described later.

The scanner unit 11 serving as an exposure unit irradiates, by using a polygon mirror, the photosensitive drum 21 with a laser beam L corresponding to image information input from an external device so as to scan and expose the surface of the photosensitive drum 21. Due to this exposure, an electrostatic latent image corresponding to the image information is formed on the surface of the photosensitive drum 21. Here, the scanner unit 11 is not limited to a laser scanner device, and, for example, an LED exposure device that has an LED array including multiple LEDs aligned along the longitudinal direction of the photosensitive drum 21 may be employed.

Next, the process cartridge 20 is described. The process cartridge 20 illustrated in detail in FIG. 1B has the development device 30. The development device 30 is equipped with a development roller 31 that serves as a developer support that supports the developer, a development container 32 that serves as a frame of the development device 30, and a supply roller 33 that can supply the developer to the development roller 31. The development roller 31 and the supply roller 33 are rotatably supported by the development container 32. Moreover, the development roller 31 is arranged in an opening portion of the development container 32 so as to face the photosensitive drum 21. The supply roller 33 is rotatably in contact with the development roller 31, and a toner that serves as a developer contained in the development container 32 is applied to the surface of the development roller 31 by the supply roller 33.

The development device 30 of this embodiment employs a contact development system as the development system. In other words, a toner layer supported on the development roller 31 comes into contact with the photosensitive drum 21 in a development portion (development region) where the photosensitive drum 21 and the development roller 31 face each other. A development voltage is applied to the development roller 31 by a development high-voltage power supply E2 that serves as a development voltage applying unit. Under a condition where a development voltage is applied, the toner supported on the development roller 31 migrates from the development roller 31 to the surface of the photosensitive drum 21 according to the potential distribution in the surface of the photosensitive drum 21, and an electrostatic latent image is thus developed into a toner image. In this embodiment, the development voltage is set to −350 V. In this embodiment, a reversal development system is employed. That is, after the surface of the photosensitive drum 21 is charged in the charging step, the surface of the photosensitive drum 21 is exposed in the exposing step, and the toner adheres to the exposed region, which is the surface of the photosensitive drum 21 where the charge amount has decayed, to thereby form a toner image.

In addition, in this embodiment, a toner whose normal charge polarity is negative polarity and particle size is 6 μm is used. For example, a polymer toner produced by a polymerization method is employed as the toner. The toner is free of a magnetic component and is a so-called nonmagnetic mono-component developer that is supported on the development roller 31 mainly by an intermolecular force or an electrostatic force (image force).

The toner particles contain multiple waxes for adjusting the melting properties of the toner during the fixing process and the adhesive force between a printing medium and a fixing roller.

Fine particles composed of silica particles having a submicron-order particle size are added to the surfaces of the toner particles to adjust the flowability and the chargeability of the toner. In this embodiment, a toner with fine particles added thereto is defined as a developer.

In this embodiment, a non-magnetic mono-component developer is described as an example; alternatively, a mono-component developer containing a magnetic component may be used. Yet alternatively, a two-component developer composed of a nonmagnetic toner and a magnetic carrier may be used as the developer. When a magnetic developer is used, for example, a cylindrical development sleeve having a magnet disposed on the inner side thereof is used as the developer support.

A stirring member 34 that serves as a stirring unit is disposed inside the development container 32. The stirring member 34 stirs the toner inside the development container 32 when rotatably driven, and simultaneously feeds the toner toward the development roller 31 and the supply roller 33. Also, the stirring member 34 has a role of circulating, within the development container, the toner unused in the developing and removed from the development roller 31, and evening out the toner inside the development container.

A development blade 35 that limits the amount of the toner supported on the development roller 31 and is made of a stainless steel plate is disposed in the opening portion of the development container 32 where the development roller 31 is disposed. A voltage having an absolute value 200 V larger on the negative polarity side than the development roller 31 is applied to the development blade 35 from a blade power supply serving as a development blade voltage applying unit E5. In other words, a voltage 200 V larger on the normal polarity side of the toner is applied to the development blade 35.

The developer supplied to the surface of the development roller 31 is evened out into a thin layer as the development roller 31 rotates and as the developer passes through a facing portion where the development roller 31 faces the development blade 35. Simultaneously, direct injection charging occurs due to triboelectric charging by the development blade 35 and due to the potential difference between the development blade 35 and the development roller 31, and thus the developer is charged to negative polarity, which is the normal polarity of the toner.

The feeder 60 has a front door 61 supported on the image forming apparatus 1 so as to be openable and closable, a loading tray 62, a middle plate 63, a tray spring 64, and a pickup roller 65. The loading tray 62 constitutes the bottom of a recording material P storage space that emerges by opening the front door 61, and the middle plate 63 is supported on the loading tray 62 so as to be liftable upward and downward. The tray spring 64 urges the middle plate 63 upward, and presses the recording material P loaded on the middle plate 63 against the pickup roller 65. Here, the front door 61 closes the recording material P storage space when closed relative to the image forming apparatus 1, and supports, together with the loading tray 62 and the middle plate 63, the recording material P when opened relative to the image forming apparatus 1.

The fixing unit 70 employs a thermal fixing system in which an image is fixed by heating and melting the toner on the recording material. The fixing unit 70 is equipped with a fixing film 71, a fixing heater, such as a ceramic heater, that heats the fixing film 71, a thermistor that measures the temperature of the fixing heater, and a pressure roller 72 that makes pressure-contact with the fixing film 71.

In this embodiment, a process cartridge 20 that is detachably attachable to an image forming apparatus body is used; however, this feature is not limiting as long as a particular image forming process can be carried out. For example, there may be a detachably attachable development cartridge as the development device 30, a detachably attachable drum cartridge as the drum unit, or a toner cartridge that supplies a toner to the development device 30 from outside, or there may be no detachably attachable cartridge.

2. Control Mode

Figure 3:
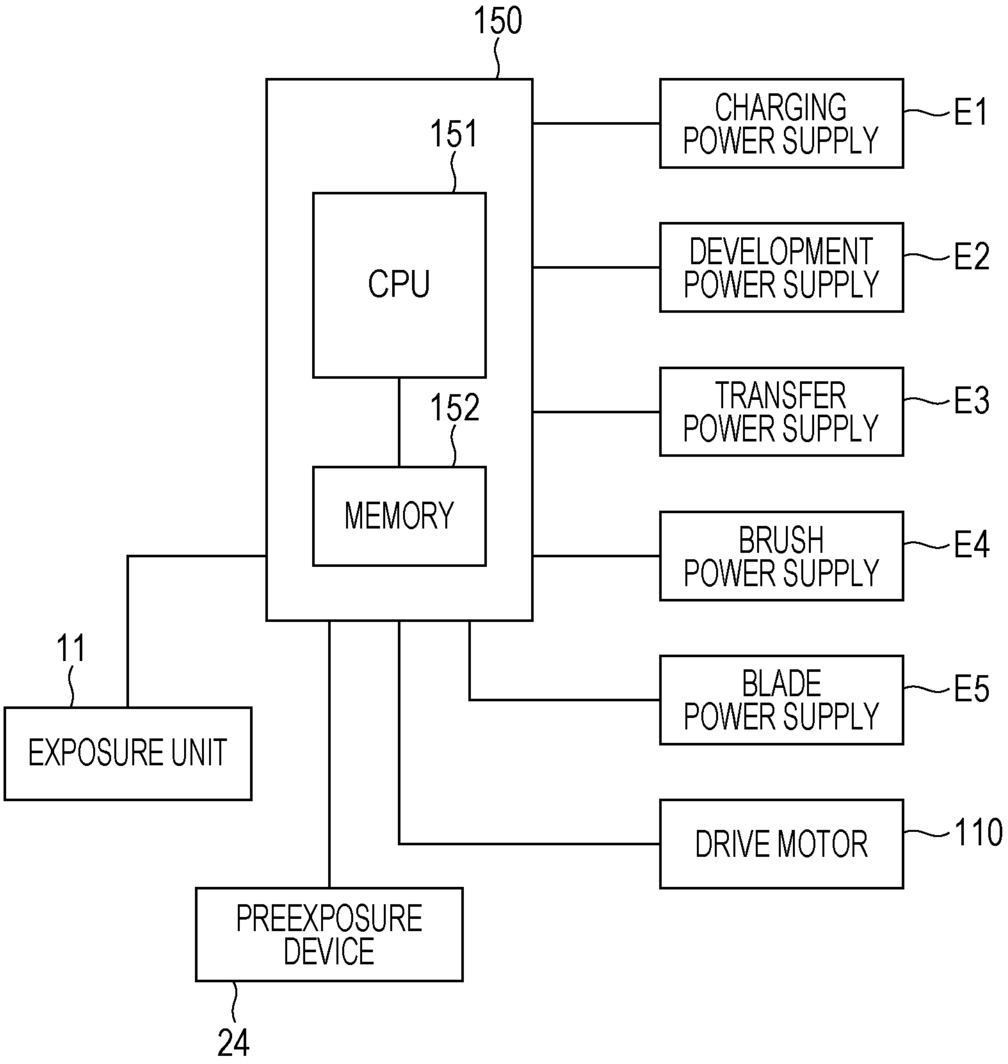
FIG. 3 is a control block diagram according to embodiment 1.

FIG. 3 is a schematic block diagram illustrating the control mode of relevant units in the image forming apparatus 1 of this embodiment. The image forming apparatus 1 includes a control unit 150. The control unit 150 includes, for example, a CPU 151 that serves as an arithmetic control unit which is the main element that performs arithmetic processes, a memory (storage element) 152 such as a ROM or a RAM serving as a storage unit, and an input/output unit (not illustrated) that controls the exchange of signals between various elements connected to the control unit 150. A RAM stores sensor detection results, arithmetic results, etc., and a ROM stores a control program, predetermined data tables, etc.

The control unit 150 is a controller that integrally controls the operation of the image forming apparatus 1. The control unit 150 controls exchange of various electrical information signals, the timing of driving, etc., and executes a predetermined image forming sequence. The units of the image forming apparatus 100 are connected to the control unit 150. For example, in relation to this embodiment, the units connected to the control unit 150 include a charging power supply E1 serving as a second charging power supply, a development power supply E2, a transfer power supply E3, a brush power supply E4 serving as a first charging power supply, a blade power supply E5, an exposure unit 11, a drive motor 110, and the pre-exposure device 24.

3. Image Forming Operation

Next, the image forming operation of the image forming apparatus 1 is described. When an image forming command is input to the image forming apparatus 1, the image forming unit 10 starts an image forming process on the basis of the image information input from an external computer connected to the image forming apparatus 1. The scanner unit 11 radiates a laser beam L toward the photosensitive drum 21 on the basis of the input image information. Here, the photosensitive drum 21 is preliminarily charged by the charging brush 22 and the charging roller 23, and an electrostatic latent image is formed on the photosensitive drum 21 by irradiation with the laser beam L. Then the electrostatic latent image is developed with the development roller 31, and a toner image is formed on the photosensitive drum 21.

Running concurrent with the aforementioned image forming process, the pickup roller 65 of the feeder 60 sends out the recording material P supported by the front door 61, the loading tray 62, and the middle plate 63. The recording material P is fed to the registration roller pair 15 by the pickup roller 65, and hits the nip of the registration roller pair 15 to have skew corrected. In addition, the registration roller pair 15 is driven in synchronization with the toner image transfer timing, and conveys the recording material P toward the transfer nip formed by the transfer roller 12 and the photosensitive drum 21.

A transfer voltage is applied from the transfer high-voltage power supply E3 to the transfer roller 12 serving as a transfer unit, and a toner image supported on the photosensitive drum 21 is transferred onto the recording material P conveyed by the registration roller pair 15. The recording material P having the toner image transferred thereto is conveyed to the fixing unit 70, and the toner image is heated and pressurized as the recording material P passes through the nip portion between the fixing film 71 and the pressure roller 72 of the fixing unit 70. As a result, the toner particles fuse and then solidify, thereby fixing the toner image onto the recording material P. The recording material P that has passed through the fixing unit 70 is ejected out of the image forming apparatus 1 by the ejection roller pair 80, and loaded in an ejection tray 81.

The ejection tray 81 is sloped downward toward the downstream direction in the recording material ejection direction, and the recording material ejected into the ejection tray 81 slides down in the ejection tray 81 to have the rear edge aligned by a regulation surface 82.

4. Photosensitive Drum

Figure 2:
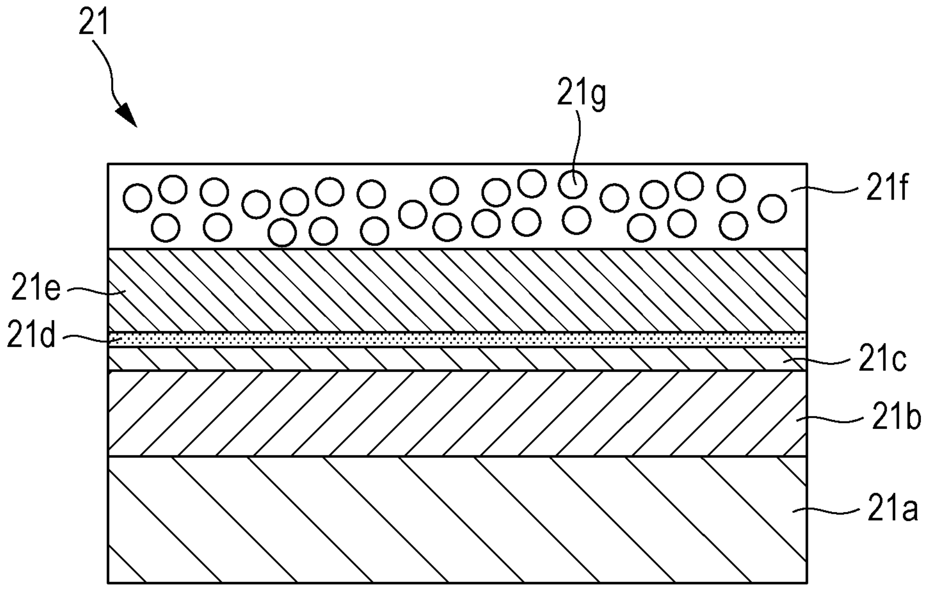
FIG. 2 is a schematic diagram of a layer structure of a photosensitive drum according to embodiment 1.

Hereinafter, the details of the photosensitive drum 21 used in this embodiment are described by taking FIG. 2 as an example.

The photosensitive drum 21 according to the present invention has an outermost surface having a charge injecting function.

The photosensitive drum 21 according to the present invention includes a conductive support 21*a*, a conductive layer 21*b*, an undercoat layer 21*c*, a photosensitive layer that includes two layers, that is, a charge generation layer 21*d* and a charge transport layer 21*e*, and a charge injection layer 21*f*. The charge injection layer 21*f* contains conductive particles 21*g*, and the amount of the conductive particles 21*g* contained relative to the entire volume of the charge injection layer 21*f* is 5.0 vol % or more and 70.0 vol % or less. Furthermore, the volume resistivity of the charge injection layer 21*f* is $1.0\times10^{9}$ Ω·cm or more and $1.0\times10^{14}$ Ω·cm or less.

At a volume resistivity less than $1.0\times10^{9}$ Ω·cm, the resistance of the charge injection layer 21*f* is too low to appropriately form an electrostatic latent image, and it becomes difficult to develop the desired image. In contrast, at a volume resistivity exceeding $1.0\times10^{14}$ Ω·cm, the resistance of the charge injection layer 21*f* is too high, and thus the feature of the present invention, that is, the charge injectability from the charging brush 22 to the charge injection layer 21*f*, is degraded, and the discharge reducing effect of the charging roller 23 described below is not easily obtained. The volume resistivity of the charge injection layer 21*f* is more preferably $1.0\times10^{11}$ Ω·cm or more and $1.0\times10^{14}$ Ω·cm or less.

To satisfy this volume resistivity range, the amount of the conductive particles 21*g* contained relative to the entire volume of the charge injection layer 21*f* is preferably 5.0 vol % or more and 70.0 vol % or less.

When the amount of the conductive particles 21*g* contained exceeds 70.0 vol %, the charge injection layer 21*f* itself becomes brittle, and the surface of the photosensitive drum 21 is prone to scraping through out the long-term use. As a result, the charge uniformity of the photosensitive drum 21 is degraded, and image defects are prone to occur due to the charging failure that occurs at high speeds. A more preferable amount of the conductive particles 21*g* contained is 5.0 vol % or more and 40.0 vol % or less.

The volume resistivity of the charge injection layer 21*f* can be controlled by the particle size of the conductive particles 21*g*, for example, in addition to the amount of the conductive particles 21*g* contained. The particle size of the conductive particles 21*g* in terms of a volume-average particle diameter is preferably 5 nm or more and 300 nm or less and more preferably 40 nm or more and 250 nm or less. When the volume-average particle diameter of the conductive particles 21*g* is less than 5 nm, the specific surface area of the conductive particles 21*g* increases, an increased amount of moisture adsorbs to vicinities of the conductive particles 21*g* in the surface of the charge injection layer 21*f*, and the volume resistivity of the charge injection layer 21*f* is likely to decrease. When the volume-average particle diameter of the conductive particles 21*g* exceeds 300 nm, the particles in the charge injection layer 21*f* disperse poorly, the area of the interface with the binder resin decreases, resulting in an increased resistance at the interface, and thus the charge injectability is likely to be degraded.

Examples of the conductive particles 21*g* contained in the charge injection layer 21*f* include particles of metal oxides such as titanium oxide, zinc oxide, tin oxide, and indium oxide. When a metal oxide is used as the conductive particles 21*g*, the metal oxide may be doped with an element such as niobium, phosphorus, or aluminum, or an oxide thereof. The conductive particles 21*g* may have a multilayer structure including a particle and a coating thereon. Examples of the particle include titanium oxide, barium sulfate, and zinc oxide. Examples of the material for the coating include metal oxides such as titanium oxide and tin oxide, and, in the present invention, titanium oxide is preferable from the viewpoint of the charge injectability from the charging brush 22.

Furthermore, when titanium oxide contains niobium, the charge injectability is further improved, and the charge injectability can be improved by using a small amount. The niobium content relative to the total mass of the niobium-containing titanium oxide particles is preferably 0.5 mass % or more and 15.0 mass % or less and more preferably 2.6 mass % or more and 10.0 mass % or less.

Figure 11:
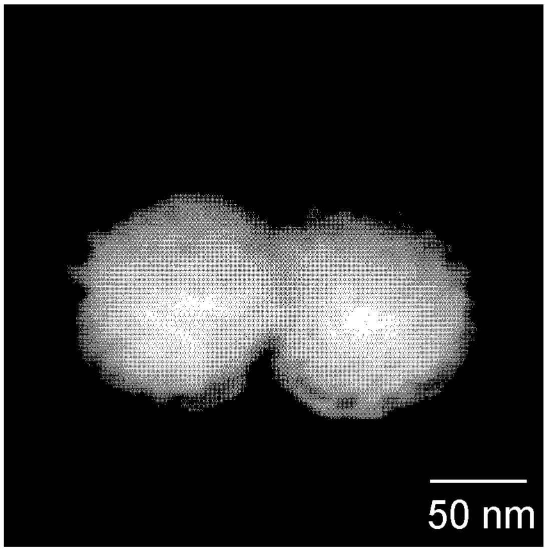
FIG. 11 is a STEM image illustrating one example of niobium-containing titanium oxide used in the embodiments.

Niobium-containing titanium oxide particles are preferably anatase or rutile titanium oxide particles and more preferably are anatase titanium oxide particles. When anatase titanium oxide is used, the charge migration in the charge injection layer 21*f* occurs smoothly, and thus charge injection is improved. Particles having anatase titanium oxide particles and a niobium-containing titanium oxide coating material located in near-surface regions thereof are more preferable. When anatase titanium oxide particles containing niobium in the near-surface regions are used, charges can easily move in the charge injection layer 21*f*, and, at the same time, the charge injectability from the charging brush 22 to the charge injection layer 21*f* can be enhanced. Furthermore, the decrease in volume resistivity of the charge injection layer 21*f* can be reduced. As a result, the electrostatic latent image retainability in a high-temperature, high-humidity environment is improved. Anatase titanium oxide preferably has an anatase rate of 90% or higher. The metal oxide particles may be doped with atoms such as niobium, phosphorus, or aluminum, or an oxide thereof, and particularly preferably are titanium oxide particles that contain niobium heavily distributed in the near-surface regions of the particles. When niobium is heavily distributed in the near-surface regions, charges can be exchanged efficiently. More specifically, the concentration ratio calculated by "niobium atomic concentration/titanium atomic concentration" in a portion that extends from the particle surface to a depth of 5% of the maximum diameter of the particle is at least 2.0 times the concentration ratio calculated by "niobium atomic concentration/titanium atomic concentration" at the center of the particle. Here, the niobium atomic concentration and the titanium atomic concentration are obtained with a scanning transmission electron microscope (STEM) connected to an energy-dispersive X-ray analyzer (EDS analyzer). FIG. 11 is a STEM image of one example of a niobium-containing titanium oxide particle used in the embodiment of the present invention. Although the details are described later, the niobium-containing titanium oxide particle used in this embodiment is prepared by coating a titanium oxide particle with niobium-containing titanium oxide, followed by firing. Thus, it is considered that niobium-containing titanium oxide provided as a coating undergoes crystal growth as niobium-doped titanium oxide by what is known as epitaxial growth along the titanium oxide crystals in the particle before the coating. Niobium-containing titanium oxide prepared as such is controlled to have a core-shell-like form where the density in the near-surface region is smaller than the density in the particle center portion.

Figure 12:
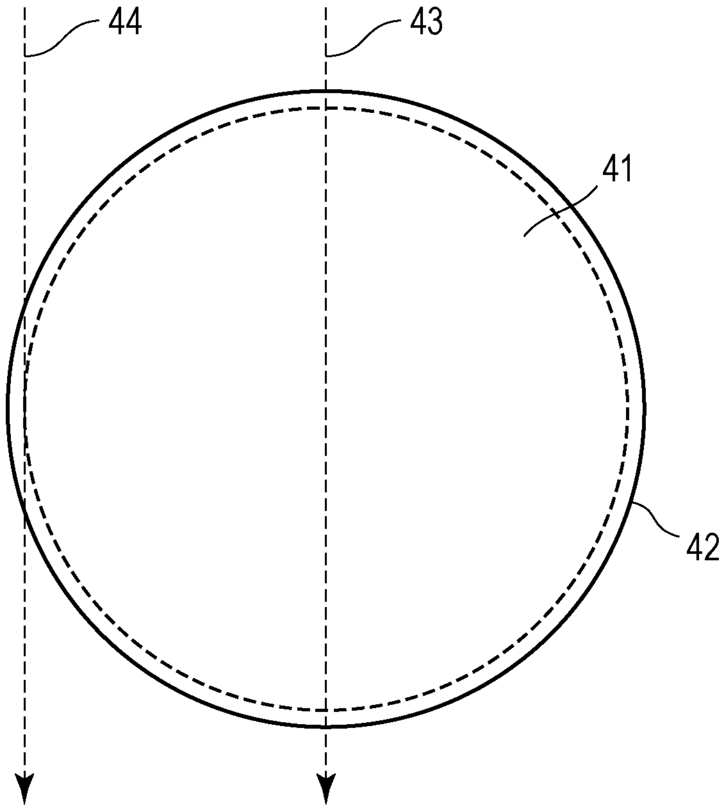
FIG. 12 is a schematic diagram illustrating one example of niobium-containing titanium oxide used in the embodiments.

The STEM image in FIG. 11 is schematically represented in FIG. 12. In FIG. 12, 41 denotes the center portion of a conductive particle, 42 denotes a near-surface region of the conductive particle, 43 denotes an X-ray that analyzes the center portion of the conductive particle, and 44 denotes an X-ray that analyzes a portion that extends from the conductive particle surface to a depth of 5% of the primary particle diameter.

In such a niobium-containing titanium oxide particle, the niobium/titanium atomic concentration ratio in the near-surface region of the particle is larger than the niobium/titanium atomic concentration ratio in the particle center portion, and niobium atoms are heavily distributed in the near-surface region of the particle. Specifically, the niobium/titanium atomic concentration ratio in the portion that extends from the particle surface to a depth of 5% of the maximum diameter of the particle is at least 2.0 times the niobium/titanium atomic concentration ratio in the particle center portion. Since the ratio is at least 2.0 times larger, charges easily move in the charge injection layer, and thus the charge injectability can be enhanced. When the ratio is less than 2.0 times, charge exchange is inhibited.

The detailed method for producing the charge injection layer 21*f* is described later.

Hereinafter, the structure of the electrophotographic photoreceptor according to the present invention is described in detail.

<Support 21*a*>

In the electrophotographic photoreceptor according to the present invention, the support 21*a* is preferably a conductive support that has electrical conductivity. Examples of the form of the support 21*a* include a cylindrical shape, a belt shape, and a sheet shape. In particular, a cylindrical support is preferable. In addition, the surface of the support 21*a* may be subjected to an electrochemical process, such as anodization, a blast process, a machining process, etc. The material for the support 21*a* is preferably metal, resin, or glass, for example. Examples of the metal include aluminum, iron, nickel, copper, gold, stainless steel, and alloys thereof. In particular, an aluminum support containing aluminum is preferable. The resin or glass is preferably given electrical conductivity by performing a process of, for example, mixing or coating with a conductive material.

<Conductive Layer 21*b*>

In the electrophotographic photoreceptor according to the present invention, the conductive layer 21*b* may be disposed on the support 21*a*. The presence of the conductive layer 21*b* hides scratches and irregularities on the support surface, and the light reflection at the support surface can be controlled. The conductive layer 21*b* preferably contains conductive particles and a resin. Examples of the conductive particles include metal oxides, metal, and carbon black.

Examples of the metal oxides include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Among these, metal oxides are preferably used as the conductive particles, and in particular, titanium oxide, tin oxide, and zinc oxide are more preferably used.

When a metal oxide is used as the conductive particles, the metal oxide may be surface-treated with a silane coupling agent or may be doped with an element such as phosphorus or aluminum, or an oxide thereof.

The conductive particles may have a multilayer structure including a particle and a coating material coating the particle. Examples of the particle include titanium oxide, barium sulfate, and zinc oxide. Examples of the coating material include metal oxides such as tin oxide.

When a metal oxide is used as the conductive particles, the volume-average particle diameter thereof is preferably 1 nm or more and 500 nm or less and more preferably 3 nm or more and 400 nm or less.

Examples of the resin include polyester resins, polycarbonate resins, polyvinyl acetal resins, acrylic resins, silicone resins, epoxy resins, melamine resins, polyurethane resins, phenolic resins, and alkyd resins. The conductive layer 21*b* may further contain a silicone oil, resin particles, and a masking agent such as titanium oxide.

The conductive layer 21*b* can be obtained by preparing a conductive layer-forming coating solution containing the aforementioned materials and a solvent, forming a coating film of the coating solution on the support 21*a*, and drying the coating film. Examples of the solvent used in the coating solution include alcohol solvents, sulfoxide solvents, ketone solvents, ether solvents, ester solvents, and aromatic hydrocarbon solvents. Examples of the method for dispersing conductive particles in a conductive layer-forming coating solution include methods that use a paint shaker, a sand mill, a ball mill, and a liquid collision-type high-speed disperser.

The average thickness of the conductive layer 21*b* is preferably 1 μm or more and 40 μm or less and particularly preferably 3 μm or more and 30 μm or less.

<Undercoat Layer 21*c*>

In the electrophotographic photoreceptor according to the present invention, the undercoat layer 21*c* may be disposed on the support 21*a* or the conductive layer 21*b*. The presence of the undercoat layer 21*c* enhances the inter-layer bonding functions, and can impart the charge injection-inhibiting function.

The undercoat layer 21*c* preferably contains a resin. Alternatively, the undercoat layer 21*c* may be formed as a cured film by polymerizing a composition that contains a monomer containing a polymerizable functional group.

Examples of the resin include polyester resins, polycarbonate resins, polyvinyl acetal resins, acrylic resins, epoxy resins, melamine resins, polyurethane resins, phenolic resins, polyvinylphenol resins, alkyd resins, polyvinyl alcohol resins, polyethylene oxide resins, polypropylene oxide resins, polyamide resins, polyamic acid resins, polyimide resins, polyamideimide resins, and cellulose resins.

Examples of the polymerizable functional group contained in the polymerizable functional group-containing monomer include an isocyanate group, a blocked isocyanate group, a methylol group, an alkylated methylol group, an epoxy group, a metal alkoxide group, a hydroxyl group, an amino group, a carboxyl group, a thiol group, a carboxylic anhydride group, and a carbon-carbon double bond group.

Furthermore, the undercoat layer 21*c* may further contain an electron transport substance, a metal oxide, a metal, a conductive polymer, etc., to improve electrical properties. Among these, an electron transport substance and a metal oxide are preferably used.

Examples of the electron transport substance include quinone compounds, imide compounds, benzimidazole compounds, cyclopentadienylidene compounds, fluorenone compounds, xanthone compounds, benzophenone compounds, cyanovinyl compounds, halogenated aryl compounds, silole compounds, and boron-containing compounds. An electron transport substance having a polymerizable functional group may be used as the electron transport substance and may be copolymerized with the aforementioned polymerizable functional group-containing monomer to form an undercoat layer 21*c* as a cured film.

Examples of the metal oxides include indium tin oxide, tin oxide, indium oxide, titanium oxide, zinc oxide, aluminum oxide, and silicon dioxide. Examples of the metal include gold, silver, and aluminum.

The metal oxide particles contained in the undercoat layer 21*c* may be surface-treated with a surface treatment agent such as a silane coupling agent.

A typical method is used to surface-treat the metal oxide particles. Examples thereof include a dry method and a wet method.

A dry method involves adding an aqueous alcohol solution, an organic solvent solution, or an aqueous solution containing a surface treatment agent to the metal oxide particles that are being stirred in a mixer, such as a Henschel mixer, capable of high-speed stirring so as to disperse the metal oxide particles, and then drying the resulting mixture.

A wet method involves dispersing metal oxide particles and a surface treatment agent in a solvent by stirring or with a sand mill using, for example, glass beads, and the solvent is removed by filtration or vacuum distillation after the dispersing. After the removal of the solvent, baking is preferably performed at 100° C. or higher.

The undercoat layer 21*c* may further contain additives, and, for example, can contain a known material such as a metal powder such as aluminum, a conductive substance such as carbon black, a charge transport substance, a metal chelate compound, or an organic metal compound.

Examples of the charge transport substance include quinone compounds, imide compounds, benzimidazole compounds, cyclopentadienylidene compounds, fluorenone compounds, xanthone compounds, benzophenone compounds, cyanovinyl compounds, halogenated aryl compounds, silole compounds, and boron-containing compounds. A charge transport substance having a polymerizable functional group may be used as the charge transport substance and may be copolymerized with the aforementioned polymerizable functional group-containing monomer to form an undercoat layer 21*c* as a cured film.

The undercoat layer 21*c* can be obtained by preparing an undercoat layer 21*c*-forming coating solution containing the aforementioned materials and a solvent, forming a coating film of the coating solution on the support 21*a* or the conductive layer 21*b*, and drying and/or curing the coating film.

Examples of the solvent used in the undercoat layer 21*c*-forming coating solution include organic solvents such as alcohols, sulfoxides, ketones, ethers, esters, aliphatic halogenated hydrocarbons, and aromatic compounds. In the present invention, alcohol and ketone solvents are preferably used.

Examples of the dispersing method for preparing the undercoat layer 21*c*-forming coating solution include methods that use a homogenizer, an ultrasonic disperser, a ball mill, a sand mill, a roll mill, a vibration mill, an attritor, and a liquid collision-type high-speed disperser.

<Photosensitive Layer>

A photosensitive layer of an electrophotographic photoreceptor is roughly classified into (1) a multilayer photosensitive layer and (2) a single-layer photosensitive layer. The multilayer photosensitive layer (1) is a photosensitive layer that includes a charge generation layer 21*d* containing a charge generation substance and a charge transport layer 21*e* containing a charge transport substance. The single-layer photosensitive layer (2) is a photosensitive layer that contains both a charge generation substance and a charge transport substance.

(1) Multilayer Photosensitive Layer

The multilayer photosensitive layer includes a charge generation layer 21*d* and a charge transport layer 21*e*.

(1-1) Charge Generation Layer 21*d*

The charge generation layer 21*d* preferably contains a charge generation substance and a resin.

Examples of the charge generation substance include azo pigments, perylene pigments, polycyclic quinone pigments, indigo pigments, and phthalocyanine pigments. Among these, azo pigments and phthalocyanine pigments are preferable. Among the phthalocyanine pigments, oxytitanium phthalocyanine pigments, chlorogallium phthalocyanine pigments, and hydroxygallium phthalocyanine pigments are preferable.

The amount of the charge generation substance contained in the charge generation layer 21*d* relative to the total mass of the charge generation layer 21*d* is preferably 40 mass % or more and 85 mass % or less and more preferably 60 mass % or more and 80 mass % or less.

Examples of the resin include polyester resins, polycarbonate resins, polyvinyl acetal resins, polyvinyl butyral resins, acrylic resins, silicone resins, epoxy resins, melamine resins, polyurethane resins, phenolic resins, polyvinyl alcohol resins, cellulose resins, polystyrene resins, polyvinyl acetate resins, and polyvinyl chloride resins. Among these, polyvinyl butyral resins are more preferable.

In addition, the charge generation layer 21*d* may further contain additives such as an antioxidant and an UV absorber. Specific examples thereof include hindered phenol compounds, hindered amine compounds, sulfur compounds, phosphorus compounds, and benzophenone compounds.

The charge generation layer 21*d* can be obtained by preparing a charge generation layer 21*d*-forming coating solution containing the aforementioned materials and a solvent, forming a coating film of the coating solution on the undercoat layer 21*c*, and drying the coating film. Examples of the solvent used in the coating solution include alcohol solvents, sulfoxide solvents, ketone solvents, ether solvents, ester solvents, and aromatic hydrocarbon solvents.

The average thickness of the charge generation layer 21*d* is preferably 0.1 μm or more and 1 μm or less and more preferably 0.15 μm or more and 0.4 μm or less.

(1-2) Charge Transport Layer 21*e*

The charge transport layer 21*e* preferably contains a charge transport substance and a resin.

Examples of the charge transport substance include polycyclic aromatic compounds, heterocyclic compounds, hydrazone compounds, styryl compounds, enamine compounds, benzidine compounds, triarylamine compounds, and resins having groups derived from these substances. Among these, triarylamine compounds and benzidine compounds are preferable.

The amount of the charge transport substance contained in the charge transport layer 21*e* relative to the total mass of the charge transport layer 21*e* is preferably 25 mass % or more and 70 mass % or less and more preferably 30 mass % or more and 55 mass % or less.

Examples of the resin include polyester resins, polycarbonate resins, acrylic resins, and polystyrene resins. Among these, polycarbonate resins and polyester resins are preferable. In particular, polyarylate resins are preferable as the polyester resins.

The content ratio (mass ratio) of the charge transport substance to the resin is preferably 4:10 to 20:10 and more preferably 5:10 to 12:10.

In addition, the charge transport layer 21*e* may further contain additives such as an antioxidant, an UV absorber, a plasticizer, a leveling agent, a slidability imparting agent, and a wear-resistance property improver. Specific examples thereof include hindered phenol compounds, hindered amine compounds, sulfur compounds, phosphorus compounds, benzophenone compounds, siloxane-modified resins, silicone oils, fluororesin particles, polystyrene resin particles, polyethylene resin particles, silica particles, alumina particles, and boron nitride particles.

The charge transport layer 21*e* can be obtained by preparing a charge transport layer 21*e*-forming coating solution containing the aforementioned materials and a solvent, forming a coating film of the coating solution on the charge generation layer 21*d*, and drying the coating film. Examples of the solvent used in the coating solution include alcohol solvents, ketone solvents, ether solvents, ester solvents, and aromatic hydrocarbon solvents. Among these solvents, ether solvents or aromatic hydrocarbon solvents are preferable.

The average thickness of the charge transport layer 21*e* is preferably 3 μm or more and 50 μm or less, more preferably 5 μm or more and 40 μm or less, and particularly preferably 10 μm or more and 30 μm or less.

(2) Single-Layer Photosensitive Layer

The single-layer photosensitive layer can be obtained by preparing a photosensitive layer-forming coating solution containing a charge generation substance, a charge transport substance, a resin, and a solvent, forming a coating film of the coating solution on the undercoat layer 21*c*, and drying the coating film. Examples of the charge generation substance, the charge transport substance, and the resin are the same as the materials disclosed in "(1) Multilayer photosensitive layer" described above.

<Charge Injection Layer **21*f*** >

The charge injection layer **21*f*** may contain a polymer of a compound having a polymerizable functional group, and a resin.

Examples of the polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic anhydride group, a carbon-carbon double bond group, an alkoxysilyl group, and a silanol group. A monomer having a charge transport ability can be used as the compound having a polymerizable functional group.

Examples of the resin include polyester resins, acrylic resins, phenoxy resins, polycarbonate resins, polystyrene resins, phenolic resins, melamine resins, and epoxy resins. Among these, acrylic resins are preferable.

The material and the particle size of the conductive particles contained in the charge injection layer **21*f*** are as described above. In addition, the surface of the metal oxide is preferably treated with a silane coupling agent, for example, from the viewpoint of dispersibility and liquid stability.

The charge injection layer **21*f*** may contain additives such as an antioxidant, an UV absorber, a plasticizer, a leveling agent, a slidability imparting agent, and a wear-resistance property improver. Specific examples thereof include hindered phenol compounds, hindered amine compounds, sulfur compounds, phosphorus compounds, benzophenone compounds, siloxane-modified resins, silicone oils, fluororesin particles, polystyrene resin particles, polyethylene resin particles, silica particles, alumina particles, and boron nitride particles.

The charge injection layer **21*f* can be obtained by preparing a charge injection layer 21*f***-forming coating solution containing the aforementioned materials and a solvent, forming a coating film of the coating solution on the photosensitive layer, and drying and/or curing the coating film. Examples of the solvent used in the coating solution include alcohol solvents, ketone solvents, ether solvents, sulfoxide solvents, ester solvents, and aromatic hydrocarbon solvents.

The average thickness of the charge injection layer **21*f*** is preferably 0.2 μm or more and 5 μm or less and more preferably 0.5 μm or more and 3 μm or less.

Although an organic photosensitive drum having an organic photosensitive layer is used as an example in this embodiment, an inorganic photosensitive drum that uses amorphous silicon as a photoreceptor or the aforementioned single-layer drum having a coating of a mixed material containing a charge generation material and a charge transport material may be used instead.

Methods for measuring the charge injection layer of the photosensitive drum and the conductive particles according to the present invention will now be described.

<Determining Primary Particle Diameter of Conductive Particles>

First, the entirety of a photosensitive drum was dipped in methyl ethyl ketone (MEK) in a measuring cylinder and exposed to ultrasonic waves to remove the resin layers, and then the base of the photosensitive drum was taken out. Next, the MEK-insoluble matter (the photosensitive layer and the conductive particle-containing charge injection layer) was filtered and dried with a vacuum dryer. Furthermore, the obtained solid was suspended in a tetrahydrofuran (THF)/methylal (1:1 vol) mixed solvent, the insoluble matter was filtered, and the residue was recovered and dried with a vacuum dryer into solid. As a result of this operation, resins of the conductive particles and the charge injection layer were obtained. The residue was further heated in an electric furnace to 500° C. so that only the conductive particles remained as a solid so as to recover the conductive particles. In order to obtain the amount of the conductive particles necessary for the measurement, multiple photosensitive drums were processed in the same manner.

A fraction of the recovered conductive particles was dispersed in isopropanol (IPA), the resulting dispersion was dropped onto a support film-attached grid mesh (Cu150J produced by JEOL Ltd.), and the conductive particles were observed with a scanning transmission electron microscope (JEM2800 produced by JEOL Ltd.) in a STEM mode. In the observation, to facilitate calculation of the particle size of the conductive particles, the magnification was set to 500,000× to 1,200,000×, and STEM images of one hundred conductive particles were taken. Here, the accelerating voltage was set to 200 kV, the probe size was set to 1 nm, and the image size was set to 1024×1024 pixels. The obtained STEM images were used to measure the primary particle diameters by using image processing software "Image-ProPlus (produced by Media Cybernetics)". First, the scale bar appearing in a lower portion of a STEM image is selected by using a straight line tool (Straight Line) in the toolbar. In such a state, selecting Set Scale in the Analyzer menu opens a new window, and the pixel distance of the selected straight line is input in a Distance in Pixels box. The value (for example, 100) of the scale bar is input in the Known Distance box in the window, the unit (for example, nm) of the scale bar is input in the Unit of Measurement box, and clicking OK ends the scale setting. Next, by using the straight line tool, a straight line was drawn to obtain a maximum diameter of the conductive particle, and the particle size was calculated. The same operation was repeated on one hundred conductive particles, and the number-average of the obtained values (maximum diameters) was assumed to be the primary particle diameter of the conductive particles.

<Determination of Niobium/Titanium Atomic Concentration Ratio>

One 5 mm square sample piece was cut out from a photoreceptor and machined to a thickness of 200 nm at a machining rate of 0.6 mm/s by using an ultrasonic ultramicrotome (UC7 produced by Leica) to prepare a thin slice sample. This thin slice sample was observed at a magnification of 500,000× to 1,200,000× in a STEM mode of a scanning transmission electron microscope (JEM2800 produced by JEOL Ltd.) connected to an EDS analyzer (energy-dispersive X-ray analyzer).

Among the sections of the observed conductive particles, sections of those conductive particles having a maximum diameter approximately 0.9 times to 1.1 times the primary particle diameter calculated as above were selected by naked eye. Next, the constituent elements of the selected sections of the conductive particles were analyzed by collecting spectra with an EDS analyzer to prepare EDS mapping images. The collection and analysis of the spectra were carried out by using NSS (Thermo Fischer Scientific). Regarding the collecting conditions, the probe size was appropriately selected from 1.0 nm and 1.5 nm so that the accelerating voltage was 200 kV and the deadtime was 15 or more and 30 or less, the mapping resolution was set to 256×256, and the number of frames was set to 300. EDS mapping images were obtained from the sections of one hundred conductive particles.

By analyzing the thus-obtained EDS mapping images, the ratios of the niobium atomic concentration (at %) to the titanium atomic concentration (at %) in the particle center portion and in the portion that extends from the particle surface to a depth of 5% of the maximum diameter of the measured particle are calculated. Specifically, first, a "Line Extraction" button of NSS is pressed down, a straight line depicting the maximum diameter of the particle is drawn, and information regarding the atomic concentration (at %) on a straight line that extends from one surface to the other surface through the inside of the particle was obtained. If the maximum diameter of the particle obtained here was less than 0.9 times or more than 1.1 times the primary particle diameter calculated as above, the particle was excluded from the further analysis. (Only the particles having a maximum diameter within the range of 0.9 times the primary particle diameter to less than 1.1 times the primary particle diameter were analyzed as below.) Next, the niobium atomic concentration (at %) in the portion that extends from the particle surface to a depth of 5% of the maximum diameter of the measured particle was read out from the both sides of the particle surface. In the same manner, the "titanium atomic concentration (at %) in the portion that extends from the particle surface to a depth of 5% of the maximum diameter of the measured particle" is obtained. Next, by using the resulting values, the "niobium atom-to-titanium atom concentration ratio in the portion that extends from the particle surface to a depth of 5% of the maximum diameter of the measured particle" was obtained from the two sides of the particle surface from the equation below.

$$\text{Niobium atom-to-titanium atom concentration ratio in the portion that extends from the particle surface to a depth of 5\% of the maxium diameter of the measure particle} = \text{"niobium atomic concentration (at\%) in the portion that extends from the particle surface to a depth of 5\% of the maximum diameter of the measured particle)/titanium atomic concentration (at\%) in the portion that extends from the particle surface to a depth of 5\% of the maximum diameter of the measured particle)}$$

Of the two concentration ratios obtained, the smaller one is assumed to be the "niobium atom-to-titanium atom concentration ratio in the portion that extends from the particle surface to a depth of 5% of the maximum diameter of the measured particle" according to the present invention.

In addition, the niobium atomic concentration (at %) and the titanium atomic concentration (at %) at the position on the straight line and corresponding to the midpoint of the maximum diameter were read out. By using the resulting values, the "niobium atom-to-titanium atom concentration ratio in the particle center portion" is obtained from the equation below.

$$\text{Niobium atom-to-titanium atom concentration ratio in the particle center portion} = \text{"niobium atomic concentration (at\%) in the particle center portion/titanium atomic concentration (at\%) in the particle center portion)}$$

Here, the "concentration ratio calculated by the niobium atomic concentration/titanium atomic concentration" in the portion that extends from the particle surface to a depth of 5% of the maximum diameter of the measured particle relative to the concentration ratio calculated by the niobium atomic concentration/titanium atomic concentration in the particle center portion" is calculated from the following:

$$\text{(Niobium atom-to-titanium atom concentration ratio in the portion that extends from the particle surface to a depth of 5\% of the maximum diameter of the measured particle)/(niobium atom-to-titanium atom concentration ratio in the particle center portion)}$$

<Determining Amount of Conductive Particles Contained>

Next, four 5 mm square sample pieces were cut out from the photoreceptor, and the charge injection layer was reconstituted into a 2 μm×2 μm×2 μm three-dimensional structure by using Slice & View of FIB-SEM. The amount of the conductive particles contained in the entire volume of the charge injection layer was calculated from the differences in contrast in Slice & View of FIB-SEM. The conditions of Slice & View were as follows.

Analytical sample processing: FIB method
Instrument used for processing and observation: NVision 40 produced by SII/Zeiss
Slice interval: 10 nm
Observation conditions:
Accelerating voltage: 1.0 kV
Sample tilt: 54°
WD: 5 mm
Detector: BSE detector
Aperture: 60 μm, high current
ABC: ON
Image resolution: 1.25 nm/pixel Analysis is performed on a 2 μm (vertical)×2 μm (horizontal) region, information for each section is integrated, and the volume V per 2 μm (vertical)×2 μm (horizontal)×2 μm (thickness) (8 μm3) is determined. The measurement environment has a temperature a 23° C. and a pressure of 1×10–4 Pa. Alternatively, Strata 400S (sample tilt: 52°) produced by FEI can also be used the instrument for processing and observation. The information for each section was obtained by image-processing the areas of the specified conductive particles of the present invention. In the image processing, image processing software, Image-Pro Plus produced by Media Cybernetics was used.

On the basis of the obtained information, for each of the four sample pieces, the volume V of the conductive particles of the present invention within the 2 μm×2 μm×2 μm volume (unit volume 8 μm3) was determined, and the amount of the conductive particles contained [vol %] (=V μm3/8 μm3×100) was calculated. The average of the amounts of the conductive particles contained in the four sample pieces was assumed to be the amount [vol %] of the conductive particles contained in the charge injection layer with respect to the entire volume of the charge injection layer.

Here, by processing all of the four sample pieces up to the interface between the charge injection layer and the underlying layer, the thickness t (cm) of the charge injection layer was measured, and the obtained value of the thickness of the charge injection layer was used to calculate the volume resistivity ρs described below in <Method for measuring volume resistivity of charge injection layer>.

<Method for Measuring Volume Resistivity of Charge Injection Layer>

In the present invention, the volume resistivity was measured with a μA (pico ampere) meter.

First, interdigitated gold electrodes having an inter-electrode distance (D) of 180 μm and a length (L) of 59 mm are formed by vapor deposition on a PET film, and then a charge injection layer having a thickness (T1) of 2 μm is formed thereon. Next, while a DC voltage (V) of 100 V is applied to the interdigitated electrodes in an environment having a temperature of 23° C. and a humidity of 50% RH and in an environment having a temperature of 32.5° C. and a humidity 80% RH, a DC current (I) is measured, and the volume resistivity ρv (Ω·cm) is obtained from equation (1) below:

$$\text{Volume resistivity } \rho v(\Omega\cdot\text{cm}) = V(V)\times T1(\text{cm})\times L(\text{cm})/\{I(A)\times D(\text{cm})\} \quad (1)$$

When it is difficult to identify the compositions of the conductive particles and the binder resin in the charge injection layer, the surface resistivity of the surface of the photosensitive drum was measured and converted into a volume resistivity. When the volume resistivity of the charge injection layer covering the surface of the photoreceptor is measured instead of the charge injection layer alone, preferably, the surface resistivity of the charge injection layer is measured and then converted into a volume resistivity.

In the present invention, interdigitated electrodes having an inter-electrode distance (D) of 180 μm and a length (L) of 59 mm are formed by gold vapor deposition on the charge injection layer surface of the photosensitive drum. Next, while a DC voltage (V) of 1000 V is applied to the interdigitated electrodes in an environment having a temperature of 23° C. and a humidity of 50% RH, the DC current (I) is measured, and the surface resistivity ρs of the charge injection layer is calculated from DC voltage (V)/DC current (I).

Furthermore, the volume resistivity ρv (Ω·cm) was calculated from the following equation (2) by using the thickness t (cm) of the charge injection layer.

$$\rho v = \rho s \times t \quad (2)$$

(ρv: volume resistivity, ρs: surface resistivity, t: thickness of charge injection layer)

In this measurement, since minute amperages are measured, an instrument capable of measuring minute currents is preferably used as a resistance meter. An example thereof is a pico ammeter 4140B produced by Hewlett-Packard. The interdigitated electrodes used and the applied voltage are preferably selected according to the material and the resistance value of the charge injection layer so that an appropriate SN ratio is obtained.

<Production Example of Electrophotographic Photoreceptor>

(Production Example of Titanium Oxide)

The anatase titanium oxide particles which are the conductive particles according to the present invention can be produced by a known sulfate method. That is, a solution containing titanium sulfate and titanyl sulfate is heated to induce hydrolysis to thereby form an aqueous titanium dioxide slurry, and this titanium dioxide slurry is dehydrated and fired to form the particles.

(Production Example of Anatase Titanium Oxide Particles 1)

Anatase titanium oxide of the present invention preferably has an anatase rate of 90% to 100%. Anatase titanium oxide having an anatase rate of nearly 100% can be produced by the aforementioned method. In addition, the charge injection layer 21*f* according to the present invention containing a niobium element-containing anatase titanium oxide in this range satisfactorily and stably achieves the rectifying properties, and the aforementioned effects of the present invention are satisfactorily achieved.

The anatase rate is a value obtained by the following equation using the intensity IA of the strongest interfering line (plane index 101) of anatase and the intensity IR of the strongest interfering line (plane index 110) of rutile measured by powder X-ray diffraction of titanium oxide.

$$\text{Anatase rate } (\%) = 100/(1 + 1.265\times IR/IA)$$

In order to adjust the anatase rate to be within the range of 90% to 100%, a solution containing titanium sulfate and titanyl sulfate as titanium compounds is heated to induce hydrolysis in preparing titanium oxide, as a result of which anatase titanium oxide having an anatase rate of nearly 100% is obtained. Alternatively, anatase titanium oxide having a high anatase rate is obtained by neutralizing an aqueous titanium tetrachloride solution with an alkali.

In the present invention, it was possible to prepare anatase titanium oxide particles 1 by controlling the titanyl sulfate solution concentration.

<Production of Conductive Particles>

(Production of Conductive Particles 1)

In water, 100 g of titanium oxide particles 1 were dispersed to prepare 1 L of an aqueous suspension, and the aqueous suspension was heated to 60° C. Thereto, a titanium niobate solution (niobium-to-titanium mass ratio in the solution was 1.0/33.7) containing a 10.7 mol/L aqueous sodium hydroxide solution and a niobium solution prepared by dissolving 3 g of niobium pentachloride ($NbCl_5$) in 100 mL of 11.4 mol/L hydrochloric acid and 600 mL of a titanium sulfate solution containing 33.7 g of titanium were simultaneously added dropwise (parallel addition) over a period of 3 hours so that the pH of the suspension was 2 to 3. After completion of the dropwise addition, the suspension was filtered, washed, and dried at 110° ° C. for 8 hours. The obtained dry matter was heat-treated (fired) in an air atmosphere at 800° C. for 1 hour, as a result of which niobium atom-containing titanium oxide particles 1 in which the niobium atoms were heavily distributed in the near-surface region were obtained. Table 1 indicates the physical properties of the niobium atom-containing titanium oxide particles 1.

Next, niobium-containing titanium oxide particles 1: 100.0 parts surface treatment agent 1 (formula (S-1) below) (trade name: KBM-3033, produced by Shin-Etsu Chemical Co., Ltd.): 3.0 parts (S-1)

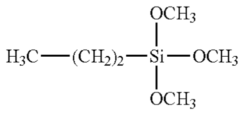

toluene: 200.0 parts

These materials were mixed, stirred with a stirrer for 4 hours, filtered, washed, and then heat-treated at 130° C. for 3 hours to obtain conductive particles 1. The physical properties of the conductive particles 1 are indicated in Table 1. The niobium atomic content in Table 1 is the amount of niobium atoms contained in the conductive particles and is a value obtained by X-ray fluorescence (XRF) elemental analysis.

TABLE 1

| | Particles | Surface treatment agent | A/B | Niobium atom content (mass %) |
|---|---|---|---|---|
| Conductive particles 1 | Niobium atom-containing titanium oxide particles 1 | Formula (S-1) | 7.9 | 5.0 |

In the table, A represents the "niobium atom-to-titanium atom concentration ratio in the portion that extends from the particle surface to a depth of 5% of the maximum diameter of the measured particle", and B represents the "niobium atom-to-titanium atom concentration ratio in the particle center portion".

Production Example 1 of Electrophotographic Photoreceptor

An aluminum cylinder (JIS A 3003 aluminum alloy) having a diameter of 24 mm and a length of 257.5 mm was used as the support 21*a* (conductive support).

Production Example 1 of Conductive Layer 21*b*

Next, the following materials were prepared.

as metal oxide particles, titanium oxide ($TiO_2$) particles (volume-average particle diameter: 230 nm) coated with oxygen-deficient tin oxide ($SnO_2$): 214 parts as a binder, a phenolic resin (monomer/oligomer of phenolic resin) (trade name: PLYOPHENE J-325 produced by Dainippon Ink and Chemicals, Incorporated, resin solid content: 60 mass %): 132 parts as a solvent, 1-methoxy-2-propanol: 98 parts These materials were placed in a sand mill along with 450 parts of glass beads having a diameter of 0.8 mm, a dispersing process was carried out under conditions of rotation rate: 2000 rpm, dispersing time: 4.5 hours, and set temperature of cooling water: 18° ° C., as a result of which a dispersion was obtained. The glass beads were removed from this dispersion with a mesh (opening: 150 μm).

To the obtained dispersion, silicone resin particles (trade name: Tospearl 120, produced by Momentive Performance Materials, average particle size: 2 μm) were added as the surface roughness imparter. The amount of the silicone resin particles added was adjusted to 10 mass % relative to the total mass of the metal oxide particles and the binder resin in the dispersion after the glass beads were removed. Furthermore, a silicone oil (trade name: SH28PA produced by Dow Toray Co., Ltd.) serving as a leveling agent was added to the dispersion so that the amount of the silicone oil relative to the total mass of the metal oxide particles and the binder in the dispersion was 0.01 mass %.

Next, a mixed solvent of methanol and 1-methoxy-2-propanol (1:1 mass ratio) was added to the dispersion so that the total mass (that is, the mass of the solid component) of the metal oxide particles, the binder, and the surface roughness imparter in the dispersion was 67 mass % relative to the mass of the dispersion. Subsequently, the resulting mixture was stirred to prepare a conductive layer 21*b*-forming coating solution.

This conductive layer 21*b*-forming coating solution was applied to the support 21*a* by dipping, and the resulting coating was heated for 1 hour at 140° C. to form a conductive layer 21*b* having a thickness of 30 μm.

Production Example 1 of Undercoat Layer 21*c*

Next, the following materials were prepared.

electron transport substance represented by formula (E-1) below: 3.11 parts blocked isocyanate (trade name: DURANATE SBB-70P produced by Asahi-Kasei Chemicals Corporation): 6.49 parts styrene-acrylic resin (trade name: UC-3920 produced by TOAGOSEI CO., LTD.): 0.4 parts silica slurry (product name: IPA-ST-UP produced by Nissan Chemical Corporation, solid component concentration: 15 mass %, viscosity: 9 mPa·s): 1.8 parts These materials were dissolved in a mixed solvent containing 48 parts of 1-butanol and 24 parts of acetone to prepare an undercoat layer 21*c*-forming coating solution. This undercoat layer 21*c*-forming coating solution was applied to the conductive layer 21*b* by dipping, and the resulting coating was heated for 30 minutes at 170° ° C. to form an undercoat layer 21*c* having a thickness of 0.7 μm.

(E-1)

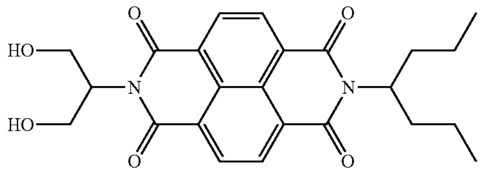

Next, 10 parts of hydroxygallium phthalocyanine having a crystal form with peaks at 7.5° and 28.4° in a chart obtained by CuKα characteristic X-ray diffractometry and 5 parts of a polyvinyl butyral resin (trade name: S-LEC BX-1 produced by Sekisui Chemical Co., Ltd.) were prepared.

These materials were added to 200 parts of cyclohexanone and dispersed for 6 hours in a sand mill apparatus using glass beads having a diameter of 0.9 mm. To the resulting dispersion, 150 parts of cyclohexanone and 350 parts of ethyl acetate were further added to dilute and to thereby obtain a charge generation layer 21*d*-forming coating solution.

The obtained coating solution was applied to the undercoat layer 21*c* by dipping, and the resulting coating was dried for 10 minutes at 95° ° C. to form a charge generation layer 21*d* having a thickness of 0.20 μm.

Here, the X-ray diffractometry was performed under the following conditions.

Powder X-Ray Diffractometry

Instrument used: X-ray diffractometer RINT-TTR II produced by Rigaku Denki Corporation
X-ray tube: Cu
Tube voltage: 50 KV
Tube current: 300 mA
Scan method: 2θ/θ scan
Scan rate: 4.0°/min
Sampling interval: 0.02°
Start angle (2θ): 5.0°
Stop angle (2θ): 40.0°
Attachment: standard sample holder
Filter: not used
Incident monochromator: used
Counter monochromator: not used
Divergence slit: open
Divergence vertical limitation slit: 10.00 mm
Scattering slit: open
Receiving slit: open
Flat monochromator: used
Counter: scintillation counter

Production Example 1 of Photosensitive Layer

Next, the following materials were prepared.

- charge transport substance (hole transport substance) represented by formula (C-1) below: 6 parts
- charge transport substance (hole transport substance) represented by formula (C-2) below: 3 parts
- charge transport substance (hole transport substance) represented by formula (C-3) below: 1 part
- polycarbonate (trade name: Iupilon Z400 produced by Mitsubishi Engineering-Plastics Corporation): 10 parts
- polycarbonate resin having copolymerization units represented by formulae (C-4) and (C-5) below (x/y=0.95/0.05: viscosity-average molecular weight=20000): 0.02 parts These materials were dissolved in a mixed solvent containing 25 parts of ortho-xylene, 25 parts of methyl benzoate, and 25 parts of dimethoxymethane to prepare a charge transport layer 21*e*-forming coating solution. This charge transport layer 21*e*-forming coating solution was applied to the charge generation layer 21*d* by dipping to form a coating film, and the coating film was dried for 30 minutes at 120° ° C. to form a charge transport layer 21*e* having a thickness of 12 μm.

(C-1)

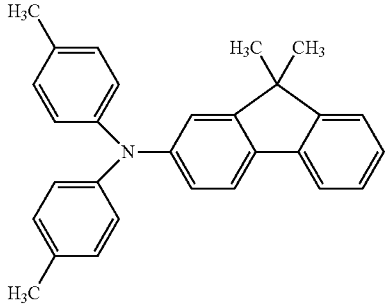

-continued (C-2)

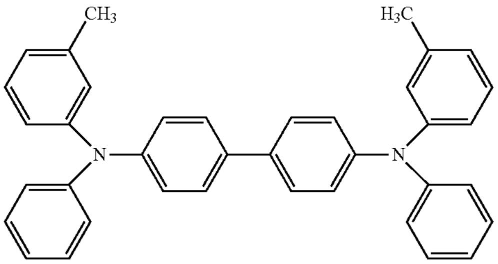

(C-3)

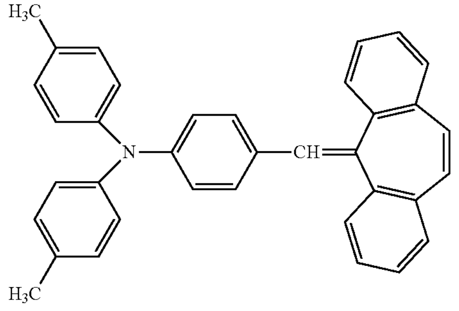

(C-4)

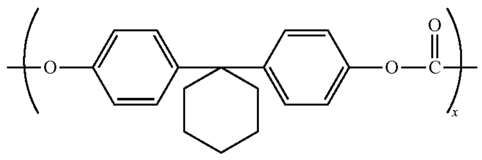

(C-5)

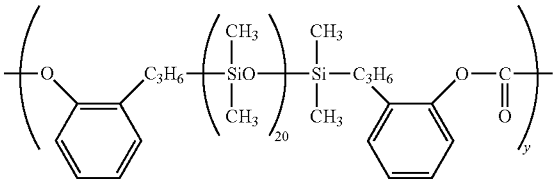

Production Example 1 of Charge Injection Layer 21*f*

Next, the following materials were prepared.

- as a binder resin, a compound represented by structural formula (O-1) below: 100.0 parts
- as conductive particles 1, the aforementioned surface-treated niobium-containing titanium oxide particles: 66.7 parts These materials were mixed in a mixed solvent containing 100 parts of 1-propanol and 100 parts of cyclohexane, and the resulting mixture was stirred with a stirrer for 6 hours. As a result, a charge injection layer 21*f*-forming coating solution was prepared.

This charge injection layer 21*f*-forming coating solution was applied to the charge transport layer 21*e* by dipping to form a coating film, and the resulting coating film was dried for 6 minutes at 50° ° C. Subsequently, while the support 21*a* (body to be irradiated) was rotated at 300 rpm, the coating film was irradiated with an electron beam for 1.6 seconds in a nitrogen atmosphere under the conditions of an accelerating voltage of 70 kV and a beam current of 5.0 mA. The dose at the position of the charge injection layer 21*f* was 15 kGy.

Subsequently, the temperature of the coating film was elevated to 117° C. in a nitrogen atmosphere. The oxygen concentration from the irradiation with the electron beam to the subsequent heat treatment was 10 ppm.

Next, the coating film was naturally cooled in air until the temperature was 25° C., and then heat-treated for 1 hour under a condition where the temperature of the coating film reached 120° C. so as to form a charge injection layer 21*f* having a thickness of 2 μm. Thus, the electrophotographic photoreceptor 1 was produced.

(O-1)

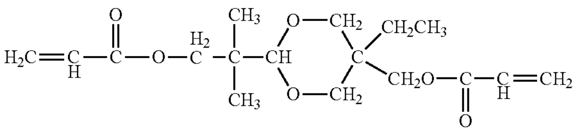

5. Recovery of Transfer Residual Toner

This embodiment employs a what is known as a cleaner-less structure in which the transfer residual toner that has not been transferred to the recording material P and remains on the photosensitive drum 21 is recovered in the development device 30 and reused. The transfer residual toner is removed in the step described below. The transfer residual toner is a mix of a toner charged to a positive polarity, which is opposite of the normal polarity of this embodiment, and a negatively charged toner not having sufficient charges. The surface potential of the photosensitive drum 21 after passing through the transfer portion is erased by the pre-exposure device 24 to about 0 V, and a charging voltage larger on the negative polarity side than the surface of the photosensitive drum 21 is applied to the charging brush 22. As a result, charges are injected by the charging brush 22 into the positively charged transfer residual toner and the toner that does not have sufficient negative charges. As a result, the transfer residual toner having sufficient negative charges do not attach to the charging brush 22 and the charging roller 23, and are conveyed as the photosensitive drum 21 rotates. As a result, the charging brush 22 and the charging roller 23 can maintain satisfactory chargeability.

When the toner is in a deteriorated state such as when the toner is near the end of the production lifetime or when large quantities of high-quality printing images have been output, there is a possibility that large quantities of the transfer residual toner would rush into the charging brush 22. In such a case, the charging brush 22 may not be able to inject sufficient charges in time to sufficiently charge the transfer residual toner to negative polarity, and a state where the transfer residual toner temporarily attaches to the charging brush 22 may continue. As a result, direct injection charging from the charging brush 22 to the photosensitive drum 21 does not occur appropriately, causing charging failure such as streaks in halftone images.

However, in this embodiment, since uniform charging is carried out by the charging roller 23 downstream of the charging brush 22, it is possible to keep outputting satisfactory images despite the transfer residual toner temporarily attaching to the charging brush 22. Since the charging roller 23 carries out charging by non-contact discharging according to the Paschen's law, uniform chargeability is little affected even when some transfer residual toner attaches thereto.

The transfer residual toner attached to the surface of the photosensitive drum 21 that has passed through a contact portion with the charging brush 22 and a contact portion with the charging roller 23 reaches a development portion as the photosensitive drum 21 rotates. Here, the behavior of the transfer residual toner that has reached the development portion is described separately: when the transfer residual toner is in an exposed portion of the photosensitive drum 21 and when the transfer residual toner is in a non-exposed portion the photosensitive drum 21. In the non-exposed portion of the photosensitive drum 21, that is, in the dark potential Vd portion, the surface potential of the photosensitive drum 21 is larger on the negative polarity side than the developing voltage applied to the development roller 31. Thus, the transfer residual toner that has sufficient negative charges migrates to the development roller 31 by the Coulomb's force generated by the electrical field, and is recovered in the development container 32. Here, the dark potential portion Vd of the photosensitive drum 21 is not limited to the non-exposed portion and may be weakly exposed as long as the surface potential of the photosensitive drum 21 is larger on the negative polarity side than the developing voltage applied to the development roller 31.

The toner recovered in the development container 32 is stirred and dispersed with the toner in the development container 32 by the stirring member 34, and supported on the development roller 31 to be used in the developing step again.

Meanwhile, in the exposed portion Vl of the photosensitive drum 21, the surface potential of the photosensitive drum 21 is smaller on the negative polarity side than the developing voltage applied to the development roller 31; thus, the transfer residual toner in the development portion does not migrate from the photosensitive drum 21 to the development roller 31 but remains on the surface of the photosensitive drum 21. The transfer residual toner remaining on the surface of the photosensitive drum 21 is supported on the photosensitive drum 21 along with other toners to be transferred from the development roller 31 to the exposed portion, reaches the transfer portion, and then is transferred onto the recording material P in the transfer portion.

In this embodiment, Vd was set to −600 V and Vl was set to −100 V. As described above, since the developing voltage was −350 V, the back contrast, which is the potential difference between the dark potential portion Vd of the photosensitive drum 21 that has passed through the contact portion with the charging roller 23 and the developing voltage (the surface potential of the development roller 31) was set to −200 V. Furthermore, the development contrast, which is the potential difference between the exposed portion Vl of the photosensitive drum 21 and the developing voltage (the surface potential of the development roller 31) was set to −250 V.

6. Charging Structure

In this section, a feature of the present embodiment, that is, charging of the photosensitive drum 21 by the charging brush 22 and the charging roller 23, is described in detail.

The charging brush 22 charges the photosensitive drum 21 mainly by direct injection charging. Since the direct injection charging does not involve discharging, discharge products do not occur. However, since only those sites that are in direct contact with the photosensitive drum 21 are chargeable, charging nonuniformity occurs if the charging brush 22 and the photosensitive drum 21 are not uniformly in contact with each other. The influence of the discharge products is described later.

The charging roller 23 charges the photosensitive drum 21 mainly by discharging. Since discharging occurs at non-contact sites according to the Paschen's law and the sites where the charging roller 23 and the photosensitive drum 21 do not contact each other are also chargeable, uniform charging is possible.

By providing the charging brush 22 on the upstream side and the charging roller 23 on the downstream side in the rotation direction of the photosensitive drum 21, the discharge products can be reduced by direct injection charging conducted by the upstream charging brush 22. Furthermore, it is possible to end the charging step by charging the photosensitive drum 21 surface and uniformly charging the surface of the photosensitive drum 21 by discharging using the downstream charging roller 23. The charging brush 22 and the charging roller 23 will now be described in detail.

The charging brush 22 contacts the photosensitive drum 21 at a particular contact force. A desired voltage is applied to the charging brush 22 by the charging high-voltage power supply E4, and the surface of the photosensitive drum 21 is neutralized to nearly 0 V by the pre-exposure device 24. The photosensitive drum 21 surface neutralized by the pre-exposure device 24 is charged to negative polarity, which is the normal polarity, mainly by direct injection charging. The charging brush 22 includes a conductive nylon fiber pile cloth having a width of 5 mm bonded and fixed to a stainless steel metal plate. The conductive nylon fibers have a fineness of 2 deniers, an implanting density of 240 fibers/$mm^2$, and a pile length of 6 mm, and are in contact with the photosensitive drum 21 such that the penetration amount from the ends of the fibers is 1.2 mm. The direct injection charging performance by the charging brush 22 improves as the contact area between the charging brush 22 and the photosensitive drum 21 increases. If the same charging brush 22 is used, the contact area tends to increase and the direct injection chargeability is improved as the penetration amount increases. However, if the penetration amount exceeds a certain level, the contact pressure between the charging brush 22 and the photosensitive drum 21 increases, and the charging brush 22 may leave scratches etc., on the photosensitive drum 21. Furthermore, in this embodiment, a cleaner-less structure in which no cleaning member for removing the developer remaining on the surface of the photosensitive drum 21 is provided is employed. According to the structure that employs the cleaner-less system as with this structure, if the contact pressure between the charging brush 22 and the photosensitive drum 21 is high, the transfer residual toner remaining un-transferred on the photosensitive drum 21 is blocked by the charging brush 22. As a result, the direct injection charging functionality of the charging brush 22 is degraded. Thus, the design values for the implant density, fineness, pile length, penetration amount, etc., of the charging brush 22 are required to be set by striking a right balance between the aforementioned viewpoints and the injection chargeability. The resistance value of the charging brush 22 is $1\times10^5\Omega$. This resistance value is obtained by bringing the charging brush 22 into contact with a metal cylinder having the same diameter as the photosensitive drum 21 under the same conditions instead of the photosensitive drum 21, and converting the value of the current that flows when a voltage of −100 V is applied. The resistance value of the charging brush 22 can be controlled by changing the resistance of the original yarn such as by changing the material of the conductive fibers of the charging brush 22. The lower the resistance value, the more the injectability of the charging brush 22 improves. However, if the resistance value is excessively decreased, a local high current flows from the charging brush 22 to the photosensitive drum 21, and what is known as pin hole leakage, which is breakdown of the charge injection layer 21*f* and the charge transport layer 21*e*, may occur. In this structure, the pin hole leakage could be suppressed when the resistance value of the charging brush 22 was $1\times 10^4\Omega$ or more. In addition, sufficient injection chargeability was exhibited at a resistance of $1\times10^8\Omega$ or less. Thus, the resistance value of the charging brush 22 is preferably adjusted to $1\times10^4\Omega$ to $1\times10^8\Omega$. From the aforementioned viewpoints, the resistance value of the charging brush 22 in this embodiment is set to $1\times10^5\Omega$.

Figure 4:
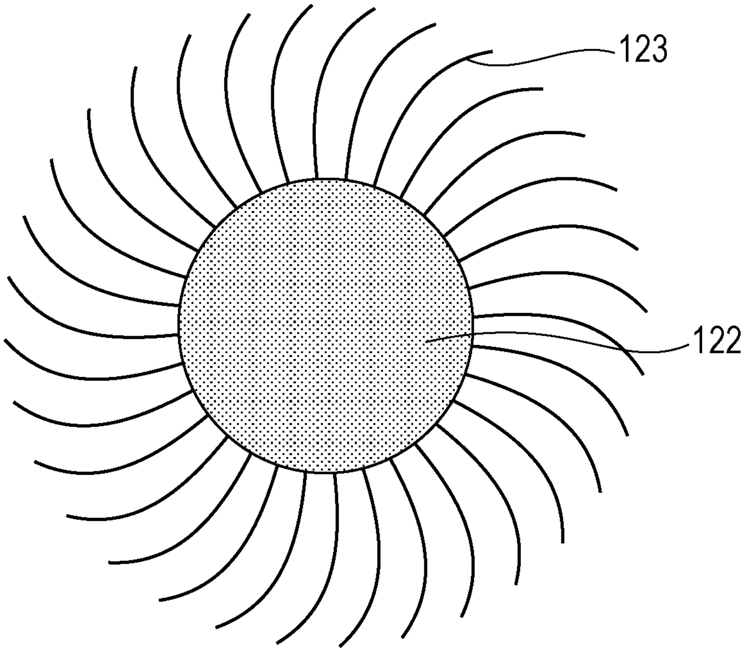
FIG. 4 illustrates another structural example of a first charging member according to embodiment 1.

Note that although a fixed brush-type charging member is described as an example in this embodiment, any other structure may be employed as long as the charging member can perform direct injection charging by contacting the photosensitive drum 21. For example, as illustrated in FIG. 4, a structure in which a charging brush 123 is wound around a roller-type metal core 122 so that the contact with the photosensitive drum 21 is made while rotating may be employed. According to these structures also, the material for the charging brush 22 and the contact structure of the charging brush 22 need to be determined from the viewpoints of the aforementioned pinhole leakage, the contact pressure with the photosensitive drum 21, and the injection chargeability. Although a brush form is employed in this embodiment, the form is not limited to the brush.

In this embodiment, a potential of −500 V is applied to the charging brush 22 so that the potential difference between the charging brush 22 and the photosensitive drum 21 is equal to or lower than the discharge starting voltage of 550 V, and the photosensitive drum 21 is charged by direct charge injection. In this structure, as mentioned above, the potential of the photosensitive drum 21 surface before the photosensitive drum 21 passes through the contact portion with the charging brush 22 is evened out to about 0 V by the pre-exposure device 24. As a result, a potential difference of 500 V can be stably secured between the charging brush 22 and the photosensitive drum 21. If the pre-exposure device 24 is not provided, the photosensitive drum 21 surface potential before passing through the charging brush 22 changes due to various factors such as the voltage applied to the transfer roller 12 and the temperature and humidity of the printing environment. In particular, the influence of the absolute value of the applied voltage (+ polarity) to the transfer roller 12 is prominent, and depending on this value, the photosensitive drum 21 surface before passing through the charging brush 22 may be charged to the + side or the − side. In such a case, it is preferable for the stable direct injection charging to control the voltage applied to the charging brush 22 so that the potential difference between the charging brush 22 and the photosensitive drum 21 assumes the target value (500 V in this embodiment) depending on the individual situation. Note that, when the potential difference between the charging brush 22 and the photosensitive drum 21 surface exceeds 550 V, discharging starts between the charging brush 22 and the photosensitive drum 21, but charging by the direct charge injection takes place simultaneously. Thus, even when the potential difference between the charging brush 22 and the photosensitive drum 21 surface exceeds 550 V, it is possible to decrease the discharge amount and reduce the discharge products by direct injection charging. However, when the first charging voltage applied to the charging brush 22 exceeds the target potential Vd (−600 V in this embodiment) of the photosensitive drum 21, the photosensitive drum 21 surface potential Vd increases on the negative polarity side from −600 V by charging using the charging brush 22. As a result, potential variation may occur on the photosensitive drum 21 surface after charging by the charging roller 23. Thus, the voltage applied to the charging brush 22 is preferably equal to or lower than Vd.

Next, the charging roller 23 is described. The charging roller 23 contacts the photosensitive drum 21 at a particular contact force on the downstream side of the charging brush 22 in the rotation direction of the photosensitive drum 21.

The charging roller 23 has a multilayer structure in which a stainless steel metal core having a diameter of 6 mm is used as a support and multiple flexible resin layers surround the metal core. In this structure, the charging roller 23 has a two-layer structure including a base layer, which is a first resin layer covering the metal core, and a surface layer, which is a second resin layer covering the base layer. The resin material of the base layer is a conductive hydrin rubber in which conductive carbon is dispersed, is formed on the metal core by extrusion molding, and has a thickness of about 2 mm. Although a conductive hydrin rubber is employed in this embodiment, any resin material that is flexible and electrically conductive may be used.

In this embodiment, as described above, the photosensitive drum 21 includes, as the outermost surface, the charge injection layer 21*f* that has a charge injecting function. Compared to the charging brush 22, the charging roller 23 has a smaller contact area with the photosensitive drum 21. Thus, although charging rarely occurs by direct charge injection in general, in this embodiment, charging by direct charge injection may happen depending on the structure of the charging roller 23 since a photosensitive drum 21 having the charge injecting function is employed. Since a charging voltage having an absolute value larger than Vd is applied to the charging roller 23, the photosensitive drum 21 surface would be charged to a value larger on the negative polarity side than Vd in the event of direct charge injection from the charging roller 23 to the photosensitive drum 21. As a result, the corresponding sites are visualized as potential variation in the image.

In order to reduce direct injection charging from the charging roller 23 to the photosensitive drum 21, the volume resistivity of the outermost surface of the charging roller 23 needs to be high, and the contact area with the photosensitive drum 21 needs to be small.

Thus, in this structure, a high-resistance resin layer having a thickness of about 30 μm and an appropriate surface Ra is formed as a surface layer on the base layer of the charging roller 23 by spray coating. When the outermost surface has a high resistance, migration of charges from the charging roller 23 to the photosensitive drum 21 can be reduced. Moreover, with the appropriate surface Ra, the charging roller 23 and the photosensitive drum 21 make point contact, and thus the area in which the charges are injected can be decreased. According to this structure, a mixture of a urethane resin material and a weight ratio of about 50% of roughening particles having a particle size of about 20 μm composed of a urethane material for imparting an appropriate Ra to the surface was used as a coating solution for forming a surface layer. The coating solution was sprayed onto the base layer to form a surface layer. The volume resistivity of the surface layer was about $1\times10^{14}$ Ω·cm, and the surface Ra was about 2.0 μm. In this embodiment, the volume resistivity of the surface layer of the charging roller 23 is preferably $1.0\times10^{12}$ Ω·cm or more and Ra of the surface is preferably 0.5 to 3.0 μm.

It was confirmed that, when the charging roller 23 of this embodiment was used and the potential difference between the charging roller 23 and the photosensitive drum 21 was equal to or smaller than the discharge starting voltage, 550 V, the charge amount was 0 V and direct injection charging rarely occurs.

A desired charging voltage is applied to the charging roller 23 by the charging high-voltage power supply E1 different from the first charging power supply E4 that applies voltage to the charging brush 22, and the surface of the photosensitive drum 21 is uniformly charged to a target potential having negative polarity mainly by discharging.

A charging voltage of −1150 V is applied to the charging roller 23 to uniformly charge the photosensitive drum 21 surface to a target Vd value, −600 V.

7. Influence of Discharge Products on Photosensitive Drum

When discharging is performed in executing an image forming operation by using the image forming apparatus 1, small amounts of discharge products such as ozone and NOx are sometimes generated and attach to the surface of the photosensitive drum 21. Although the discharge products are scraped off by a member contacting the photosensitive drum 21, the discharge products gradually accumulate on the surface of the photosensitive drum 21 as the image forming operation is repeated if the amount attached is larger than the amount scraped off. The discharge products attaching to the surface of the photosensitive drum 21 absorb moisture and decrease the electrical resistance of the surface of the photosensitive drum 21, and thus the charge retaining ability of the photosensitive drum 21 is degraded, and charges may be injected into the surface of the photosensitive drum 21 under voltage application.

Next, the influence of the discharge products on the formation of the surface potential of the photosensitive drum 21 is described.

Figure 5:
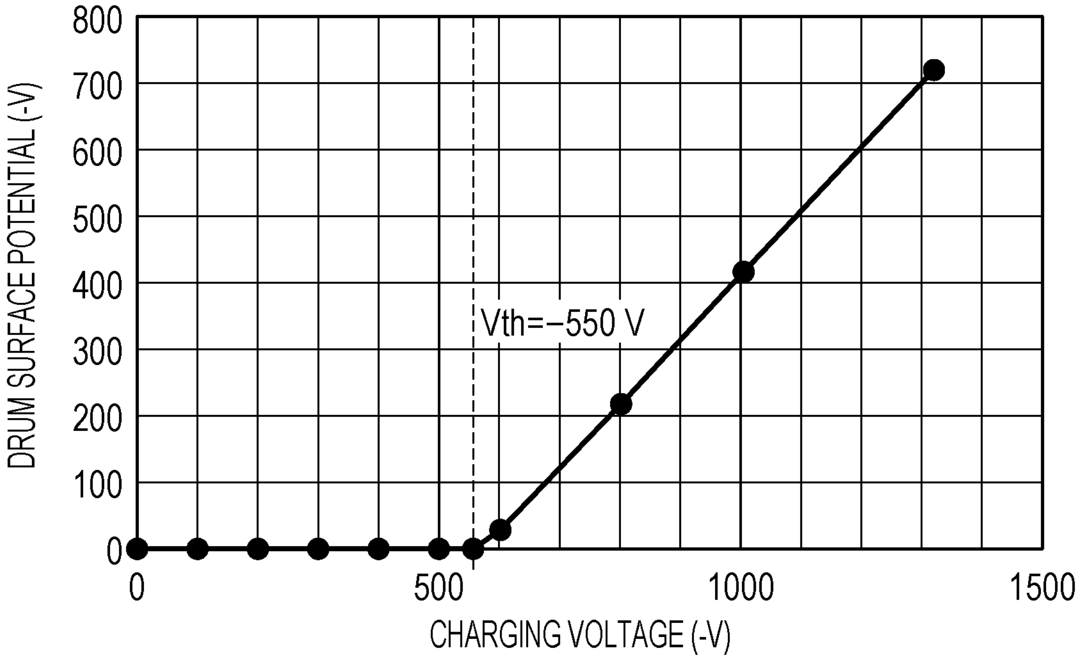
FIG. 5 is a graph illustrating a discharge starting voltage for forming a surface potential of the photosensitive drum according to embodiment 1.

FIG. 5 is a graph showing the relationship between the charging voltage applied to the charging roller 23 and the surface potential of the photosensitive drum 21 obtained from the results measured in a high-temperature, high-humidity environment having a temperature of 32.5° C. and a relative humidity of 80%. The surface potential on the photosensitive drum 21 remains unchanged when the absolute value of the charging voltage is small, and the potential begins to form on the photosensitive drum 21 surface at a certain voltage value and onward. This value is the discharge starting voltage Vth. In this embodiment, Vth is −550 V. The Vth is determined from the gap between the charging roller 23 and the photosensitive drum 21, the thickness of the photosensitive layer, and the relative permittivity of the photosensitive layer. When a voltage having an absolute value of Vth or more is applied to the charging roller 23, a discharge phenomenon occurs at the gap according to the Paschen's law, and the charges land on the photosensitive drum 21.

Figure 6:
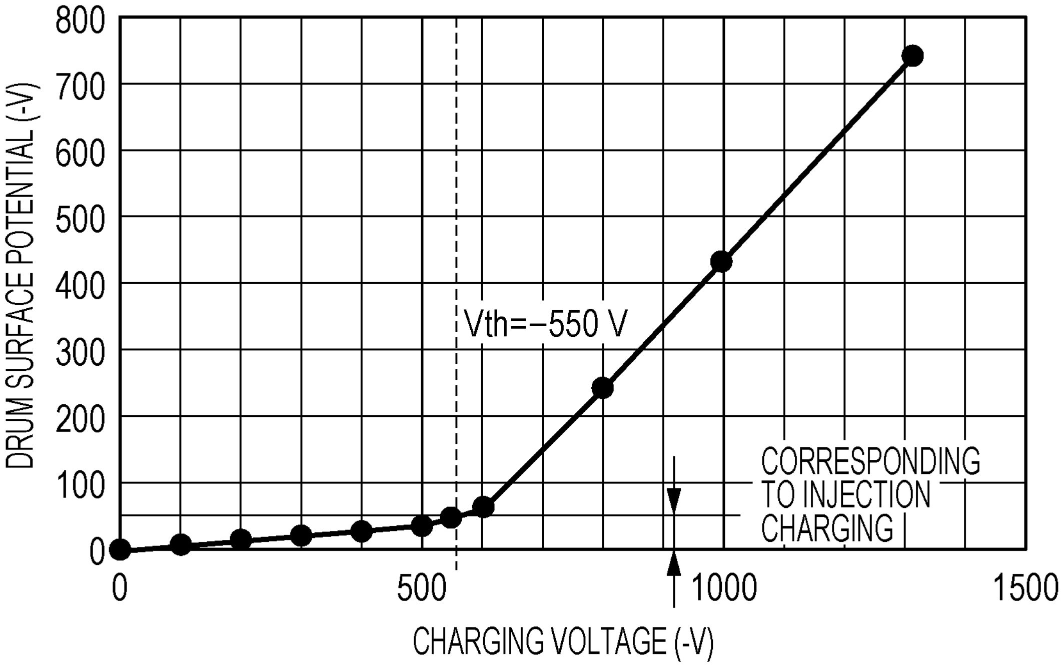
FIG. 6 is a graph illustrating a discharge starting voltage for forming a surface potential of the photosensitive drum according to embodiment 1.

As with FIG. 5, FIG. 6 is a graph showing the relationship between the charging voltage applied to the charging roller 23 and the surface potential of the photosensitive drum 21 obtained from the results measured in a high-temperature, high-humidity environment having a temperature of 32.5° C. and a relative humidity of 80% by using a photosensitive drum 21 having discharge products attached thereto. Since the discharge products absorb moisture in a high-humidity environment, the electrical resistance of the surface of the photosensitive drum 21 is likely to decrease. Thus, unlike the results shown in FIG. 5 measured in the same environment, it is found that the potential begins to form at an applied voltage having an absolute value smaller than Vth, and that a potential of about −50 V is formed under application of Vth. This is because the electrical resistance of the surface of the photosensitive drum 21 to which the discharge products have attached has decreased, and a minute potential is formed by injection charging even under application of a voltage lower than Vth. The amount of this injection charging is dependent on the amount of the discharge products on the photosensitive drum 21.

As such, the discharge products decrease the electrical resistance of the surface of the photosensitive drum 21, and the electrical current flows to the portion where a large amount of discharge products are attached. As a result, formation of an appropriate electrostatic latent image and an appropriate surface potential on the surface of the photosensitive drum 21 is no longer possible, and a phenomenon known as image deletion, which is blurring of the electrostatic latent image, may occur.

8. Effects of Suppressing Image Deletion and Improving Uniform Chargeability.

In this section, experimental results regarding the effects of suppressing image deletion and improving uniform chargeability attained by the structure of the present embodiment are described.

As mentioned above, image deletion occurs due to the discharge products and a decrease in resistance of the surface of the photosensitive drum 21, and degradation is particularly prominent in a high-temperature, high-humidity environment. Thus, evaluation of the image deletion and the uniform chargeability of this embodiment was performed in a high-temperature, high-humidity environment having a temperature of 32.5° C. and a humidity of 80%.

In this embodiment, the photosensitive drum 21 is rotated by a drive motor 110 at a circumferential speed of 168 mm/sec. The surface potential of the photosensitive drum 21 that has passed through the transfer portion, which is a facing portion where the photosensitive drum 21 and the transfer roller 12 face each other, is decreased to about 0 V due to charge erasing performed by the pre-exposure device 24.

After the surface potential of the photosensitive drum 21 has decreased to about 0 V, the photosensitive drum 21 is again charged by the charging brush 22 and the charging roller 23 up to Vd.

Here, with the charging brush 22 and the charging roller 23 combined, an electrical current of about 32 μA has been necessary as the charging current for charging the surface of the photosensitive drum 21 to Vd.

In this embodiment, the charging current that flows in the charging brush 22 and the charging current that flows in the charging roller 23 were separately measured to estimate what percentage of the entire charges the charging brush 22 and the charging roller 23 each account for. The charging current flowing in the charging brush 22 is consumed by direct injection charging, and the charging current flowing in the charging roller 23 is consumed by charging by discharging. Thus, by measuring the charging currents flowing in the charging brush 22 and the charging roller 23, the ratio of the charge amount charged by direct injection charging with respect to the total charge amount can be calculated. Hereinafter, this ratio of the charge amount is referred to as the direct injection charging ratio.

In this embodiment, the charging current flowing in the charging brush 22 was 22 μA, the charging current flowing in the charging roller 23 was 10 μA, and, with a total of 32 μA of current flowing, the surface potential of the photosensitive drum 21 after contacting the charging roller 23 was −600 V. In other words, the direct injection charging ratio was about 69%, and the charge amount accounted for by the discharging was decreased to about 31%.

Table 2 summarizes the image density variation and the incidence of the image deletion observed from the present structure and comparative examples. For the image density variation, a halftone image was output, and the case in which density variation that could be visualized was found was rated X. Evaluation of the image deletion was carried out in an environment having a temperature of 32.5° C. and a relative humidity of 80%. 5,000 sheets of Xerox multipurpose paper (grammage: 75 $g/m^2$, LTR size) produced by Xerox Corporation were continuously fed, and, after the apparatus was left standing for 12 hours, a halftone image and a text image were formed and evaluated.

The printed image was a solid white image, and the level of image deletion was evaluated as follows: the case where tone changes were found in the halftone image but no abnormality in the text was rated poor and the case where changes were found in the tone in the halftone image and in the text was rated fair.

In this embodiment, the volume resistivity of the outermost surface of the electrophotographic photoreceptor 1 serving as a drum was $1\times10^{12}$ Ω·cm, voltages of −500 V and −1150 V were respectively applied to the charging brush 22 and the charging roller 23, and the direct injection charging ratio was 69%. There was no image density variation or image deletion, and satisfactory images could be printed from the initial stage to after feeding of 5,000 sheets of paper.

In Comparative Example 1, the photosensitive drum 21 in the electrophotographic photoreceptor 1 had no charge injection layer *21f*, and the charge transport layer *21e* constituted the outermost surface layer. The volume resistivity of the surface of the photosensitive drum 21 was $1\times10^{15}$ Ω·cm. In Comparative Example 1, even when a voltage of −500 V was applied to the charging brush 22, a charging current of only about 11 μA flowed in the photosensitive drum 21, and the direct injection charging ratio was 34%. According to this structure, in order to perform charging to a Vd of −600 V, charging by discharging of the charging roller 23 had to account for the majority, and thus the amount of the discharge products generated increased, and the surface of the photosensitive drum 21 was modified. Thus, the level of the image deletion after feeding 5,000 sheets of paper in Comparative Example 1 was rated Δ, that is, the level at which tone changes occurred in the halftone image.

In the structure of Comparative Example 2, the charging brush 22 was not installed, and only the charging roller 23 was used to charge the photosensitive drum 21. Since the charging roller 23 had high resistance and a roughened surface, charging by direct injection charging did not occur despite the presence of the charge injection layer *21f* constituting the outermost surface of the photosensitive drum 21, and the direct injection charging ratio was 0%. Since the photosensitive drum 21 was entirely charged by discharging, the amount of the discharge products increased, and the photosensitive drum 21 surface was modified as a result. Thus, the level of the image deletion after feeding 5,000 sheets of paper in Comparative Example 2 was rated X, that is, the level at which even the text was affected.

In the structure of Comparative Example 3, the charging roller 23 was not installed, and only the charging brush 22 was used to charge the surface of the photosensitive drum 21. When a voltage of −1050 V was applied to the charging brush 22, the surface potential of the photosensitive drum 21 was −600 V. The reason why the surface of the photosensitive drum 21 could be charged to a Vd potential at a low applied voltage compared to the charging roller 23 is that the charging brush 22 charges the photosensitive drum 21 by both direct injection charging and discharging. Although it is not possible to measure the direct injection charging ratio for this case, discharging starts upstream of the contact portion where the fibers of the charging brush 22 and the photosensitive drum 21 contact each other in the rotation direction of the photosensitive drum 21, and thus it is considered that the photosensitive drum 21 is mainly charged by discharging. Since direct injection charging takes place at the contact portion between the charging brush 22 and the photosensitive drum 21 after discharging, the voltage applied to the charging brush 22 to charge the surface potential of the photosensitive drum 21 to −600 V was −1050 V, which had an absolute value 100 V smaller than that for the charging roller 23. It is thus considered that the charging corresponding to 100 V was carried out by direct injection charging. Thus, the direct injection charging ratio here is estimated to be about 17%. Furthermore, since the contact state between the charging brush 22 and the photosensitive drum 21 varies, the sites with a large contact area are more easily charged by direct injection, and the sites that do not make contact are not charged by injection. Thus, even when the average surface potential of the photosensitive drum 21 was −600 V, there was extensive microscopic potential variation, many streaks occurred on the halftone image, and the image density variation was rated X. Since it was estimated that the direct injection charging ratio would be smaller than that of the present embodiment, the level of the image deletion was rated Δ, that is, the level at which tone changes occurred in the halftone image.

TABLE 2

| | Surface resistivity of drum surface [Ω · cm] | Charging brush (applied voltage) | Charging roller (applied voltage) | Direct charge injection amount ratio | Image density variation | Image deletion level |
|---|---|---|---|---|---|---|
| Present embodiment | $1.0 \times 10^{12}$ | Yes (−500 V) | Yes (−1150 V) | 67% | good | good |
| Comparative Example 1 | $1.0 \times 10^{15}$ | Yes (−500 V) | Yes (−1150 V) | 36% | good | fair |
| Comparative Example 2 | $1.0 \times 10^{12}$ | No | Yes (−1150 V) | 0% | good | poor |
| Comparative Example 3 | $1.0 \times 10^{12}$ | Yes (−1050 V) | No | 17% (estimated value) | poor | fair |

In view of the above, embodiment 1 has the following structures and features.

There is provided a photosensitive drum 21 that is rotatable and that includes a support 21*a* composed of an aluminum cylinder and a charge injection layer 21*f* as a surface layer constituting a surface. Also provided is a charging brush 22, which is a first charging member that forms a first charging portion when brought into contact with the surface of the photosensitive drum 21, and that charges the surface of the photosensitive drum 21 in the first charging portion. There is provided a development roller 31 as a development member that supplies a developer to the surface of the photosensitive drum 21 in a facing portion where the development roller 31 faces the surface of the photosensitive drum 21. Also provided is a charging roller 23 serving as a second charging member that is disposed downstream of the first charging portion and upstream of the facing portion in the rotation direction of the photosensitive drum 21 and that charges the surface of the photosensitive drum 21, which has been charged by the charging brush 22, in a second charging portion where the charging roller 23 faces the surface of the photosensitive drum 21. Also provided are a first charging voltage applying unit E4 that applies a first charging voltage to the charging brush 22, and a second charging voltage applying unit E1 that applies a second charging voltage to the charging roller 23. Also provided is a control unit 150 that controls the first charging voltage applying unit E4 and the second charging voltage applying unit E1. The volume resistivity of the charge injection layer 21*f* of the photosensitive drum 21 is $1.0\times10^{9}$ Ω·cm or more and $1.0\times10^{14}$ Ω·cm or less. The control unit 150 controls the second charging voltage applied to the second charging voltage applying unit E1 such that a second potential difference formed between the surface of the photosensitive drum 21 charged by the charging brush 22 and the charging roller 23 is equal to or higher than a discharge starting voltage.

There is provided a transfer roller 12 that forms a transfer portion where the transfer roller 12 faces the photosensitive drum 21 and that transfers, in the transfer portion, a toner image from the photosensitive drum 21 to a recording material P serving as a transfer-receiving body. After the toner image formed on the surface of the photosensitive drum 21 is transferred onto the recording material P in the transfer portion, the toner remaining on the photosensitive drum 21 is recovered by the development roller 31.

In addition, the charging brush 22 has a form of a fixed brush. The charging brush 22 may have a form of a brush roller. The charging brush 22 preferably has electrical conductivity and preferably has a resistance value of $1.0\times10^{4}$Ω or more and $1.0\times10^{8}$Ω or less. The control unit executes control such that the first charging voltage has an absolute value smaller than the surface potential of the photosensitive drum 21 formed after being charged by the second charging voltage. Furthermore, the control unit 150 controls the first charging voltage applied to the first charging voltage applying unit E4 such that a first potential difference formed between the surface of the photosensitive drum 21 and the charging brush 22 is smaller than the discharge starting voltage. The control unit 150 executes control such that the charging current flowing in the charging brush 22 is 40% or more of the total of the charging currents flowing in the charging brush 22 and the charging roller 23. The charging roller 23 has a form of a roller. The volume resistivity of the outermost surface of the charging roller 23 is preferably $1.0\times10^{12}$ Ω·cm or more. Furthermore, the surface Ra of the outermost surface of the charging roller 23 is preferably 0.5 to 3.0 μm. The surface layer included in the photosensitive drum 21 is a charge injection layer 21*f*. The charge injection layer 21*f* has a structure in which conductive particles are dispersed in a binder resin. The charge injection layer **21*f*** may be composed of amorphous silicon. Conductive fine particles may be added to the surface of the developer and may contain phosphorus oxide.

Due to the structures described above, in the charging structure that involves direct charge injection into the surface of the photosensitive drum 21, the charging nonuniformity can be reduced while generation of the discharge products by discharging and modification of the photosensitive drum 21 surface are reduced.

Figure 7:
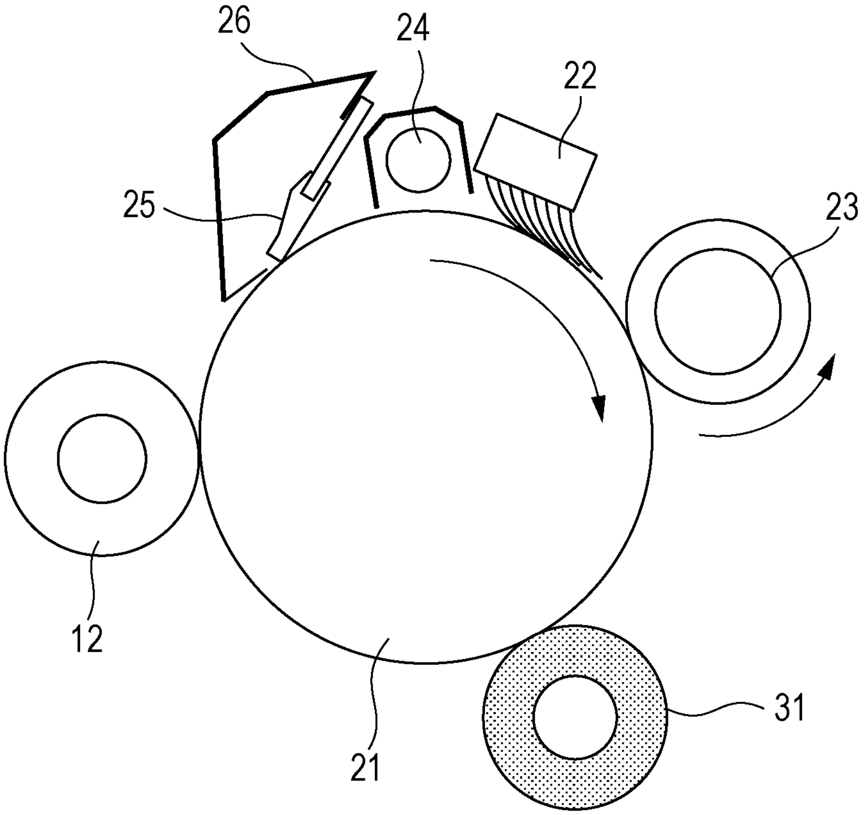
FIG. 7 illustrates a structural example in which a cleaning member that cleans the photosensitive drum is added according to embodiment 1.

Although this embodiment employs a cleaner-less structure in which the transfer residual toner is recovered in the development device 30 and reused, a typical known cleaning blade that contacts the photosensitive drum 21 may be used to recover the transfer residual toner. FIG. 7 illustrates a charging structure having a cleaning blade 25 in addition. The transfer residual toner recovered by the cleaning blade 25 and foreign matter, such as paper dust, on the photosensitive drum 21 are recovered in a recovery container 26 installed separately from the development device 30.

According to this structure, since foreign matter on the photosensitive drum 21 is removed by the cleaning blade 25, there is an advantage in that the decrease in direct injection chargeability from the charging brush 22 to the photosensitive drum 21 caused by the foreign matter attaching to the charging brush 22 can be reduced.

However, the recovery container 26 for recovering the foreign matter removed from the cleaned photosensitive drum 21 is necessary, and as the product lifetime extends, a larger space is necessary for the recovery container 26.

Although a technology of downsizing the recovery container 26 by conveying the foreign matter, which has been recovered from the drum into the recovery container 26, to a separate recovery container installed in a dead space inside the printer body by using a screw member or the like is also common, this increases the cost of the product itself.

Whether to add the cleaning blade 25 is preferably selected from the viewpoints such as the lifetime and cost of the product, the cartridge size, and the required direct injection chargeability.

Embodiment 2

Figure 8:
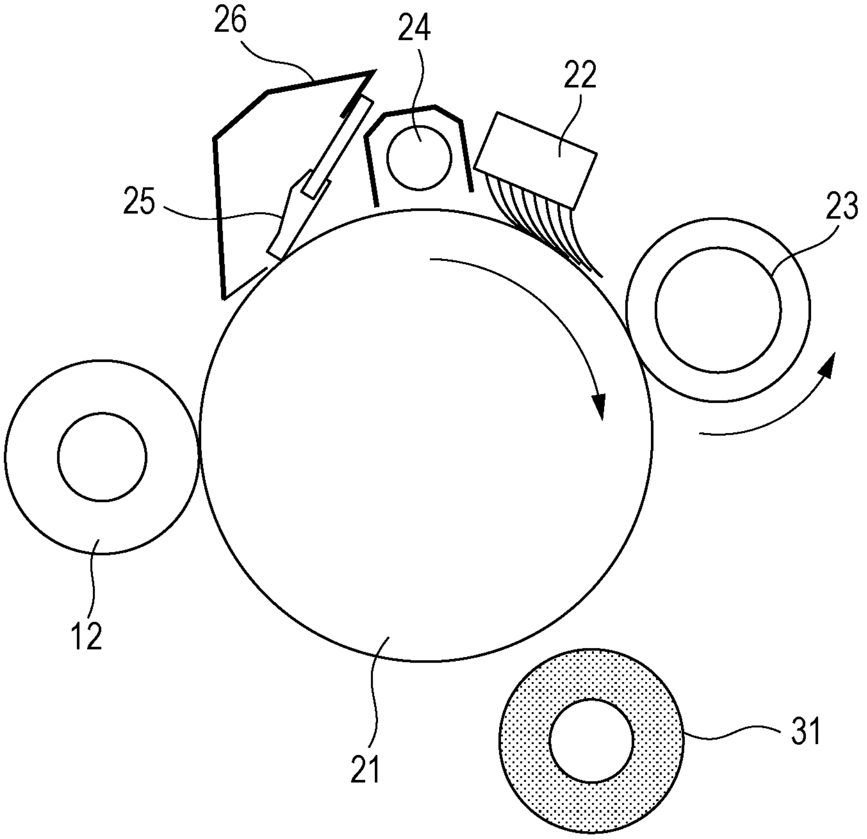
FIG. 8 illustrates another structural example of a photosensitive drum and a development member according to embodiment 2.

As illustrated in FIG. 8, embodiment 2 involves a structure in which the photosensitive drum 21 and the development roller 31 are arranged not to contact each other. Since the structures other than the arrangement of the photosensitive drum 21 and the development roller 31 are the same as those of embodiment 1, the detailed descriptions therefor are omitted.

The structure related to this proposal features that the volume resistivity of the outermost surface of the photosensitive drum 21 is $1.0\times10^9$ Ω·cm or more and $1.0\times10^{14}$ Ω·cm or less, which is lower than a typical photosensitive drum 21.

By controlling the outermost surface of the photosensitive drum 21 to be within this range of volume resistivity, good direct charge injectability from the charging brush 22 to the photosensitive drum 21 is exhibited; however, issues may arise in the contact portion between the photosensitive drum 21 and the development roller 31.

When the volume resistivity of the outermost surface of the photosensitive drum 21 is low, depending on the volume resistivity of the surface of the development roller 31, the charges on the surface of the photosensitive drum 21 may migrate to the development roller 31 in the contact portion between the photosensitive drum 21 and the development roller 31, and the surface potential of the photosensitive drum 21 may become unstable. As a result, image defects such as image density variation occur in printed images.

Furthermore, charge migration may occur between the photosensitive drum 21 and the toner, similarly resulting in density variation.

As illustrated in FIG. 8, these issues can be reduced by arranging the photosensitive drum 21 and the development roller 31 not to contact each other. By retaining a minute gap between the photosensitive drum 21 and the development roller 31 by using a roller regulation member or the like, the photosensitive drum 21 and the development roller 31 or the photosensitive drum 21 and the toner are prevented from making physical contact. This eliminates mutual charge migration and reduces occurrence of density variation.

As for the size of the minute gap, an electrical field intensity necessary for the toner to jump from the development roller 31 to a printing portion (scanner exposed portion) of the photosensitive drum 21 is necessary. In addition to the aforementioned electrical field intensity, an electrical field intensity necessary for preventing the toner from jumping to the non-printing portion (scanner non-exposed portion) must be controlled within the range maintained between the photosensitive drum 21 and the development roller 31.

As in this embodiment, when a DC electrical field is formed between the photosensitive drum 21 and the development roller 31, the amount of the minute gap is preferably 10 to 100 μm and more preferably 10 to 50 μm. Within this gap amount, it was possible to perform development in the same manner as the contact development by using the set values for the latent image described in embodiment 1.

When a minute gap amount is provided and when the magnitude of the gap amount varies depending on longitudinal positions or varies depending on the circumferential position during driving, the electrical field intensity between the photosensitive drum 21 and the development roller 31 may change, the development property may change, and the image density variation may occur. Thus, the gap amount needs to be precisely controlled.

By sufficiently increasing the gap amount between the photosensitive drum 21 and the development roller 31 with respect to the fluctuation of the gap amount, the developing property is less affected by the gap amount fluctuation. In the image forming apparatus of this embodiment, as long as the gap amount is 150 μm or more, the influence of the gap amount variation on the image is sufficiently diminished.

However, if the gap amount is large, the electrical field difference for securing an electrical field intensity necessary for the developing property between the photosensitive drum 21 and the development roller 31 notably increases. It is difficult with a typical photosensitive drum 21 to perform charging up to a potential necessary for this electrical field difference. Moreover, when the photosensitive drum 21 is charged to a high charged potential, the discharge amount increases, and the image deletion tends to be more extensive.

Thus, when the gap amount between the photosensitive drum 21 and the development roller 31 is set to a somewhat large value, a high-frequency AC voltage having a large amplitude is preferably superimposed on a DC voltage and applied to the development roller 31 in order to form an electrical field intensity necessary for development. Specifically, it is common practice to employ a what is known as jumping phenomenon in which the toner on the photosensitive drum 21 is caused to undergo reciprocal motions with respect to a printing portion and a non-printing portion on the photosensitive drum 21 by using the AC voltage so as to develop the toner.

When an AC voltage having an amplitude for forming an electrical field intensity necessary for development is superimposed on the development roller 31, the voltage of the development roller 31 alternate between a state where the voltage is larger on the negative charge side than the potential of the non-printing portion of the photosensitive drum 21 and a state where the voltage is smaller on the negative charge side than the potential of the printing portion of the photosensitive drum 21.

In a state where the voltage of the development roller 31 is larger on the negative charge side than the potential of the non-printing portion of the photosensitive drum 21, the toner also jumps onto the non-printing portion on the photosensitive drum 21 (development), but a stronger force that causes the toner to jump (development) works in the printing portion.

In contrast, in a state where the voltage of the development roller 31 is smaller on the negative charge side than the potential of the printing portion of the photosensitive drum 21, the toner also jumps from the printing portion on the photosensitive drum 21 to land on the development roller 31 and is peeled off; however, a stronger force that peels off the toner works from the non-printing portion.

When this cycle is periodically repeated by the AC voltage, eventually, toner jumping (development) becomes dominant in the printing portion on the photosensitive drum 21, and the non-printing portion converges into a state where peeling of the toner is dominant. As a result, an image following the latent image on the photosensitive drum 21 can be formed. The frequency of the AC voltage to be superimposed is typically set to be within the range sufficient for the convergence of the development and peeling.

For example, as in this embodiment, suppose that conditions are as follows: the charged potential of the non-printing portion of the photosensitive drum 21 is set to −600 V, the charged potential of the printing portion is set to −100 V, the development voltage is set to −350 V, and the circumferential rotation speed of the drum is set to 170 mm/second. When the gap amount of 300 μm was set between the photosensitive drum 21 and the development roller 31 under these conditions, it was possible to form an image following the latent image by using a development voltage in which an AC voltage of about 2000 Vp-p with a frequency of about 2,500 Hz was superimposed on a DC voltage of −350 V. Here, Vp-p represents the absolute value of the difference between the maximum value and the minimum value of the alternating potential of the AC voltage.

The gap amount between the photosensitive drum 21 and the development roller 31 is preferably between 150 μm and 400 μm. When the gap amount is less than 150 μm, the changes in the developing property caused by fluctuation of the gap amount occur more extensively. In contrast, when the gap amount is more than 400 μm, the toner jumping distance from the development roller 31 to the photosensitive drum 21 increases, the toner becomes more susceptible to the influence of the gradient force created by the latent image, and what is known as sweep-up and image blurring are likely to occur.

When jumping development is employed, it is difficult to recover the transfer residual toner by using the development roller 31, and thus, as illustrated in FIG. 7, a cleaning blade 25 that removes foreign matter on the photosensitive drum 21 is preferably in contact with the photosensitive drum 21.

In addition, during developing using an AC voltage, once the toner that has almost no charges reaches the non-printing portion on the photosensitive drum 21 by being dragged by a toner having charges, this toner cannot be ripped away from the drum and stays on the drum, thereby generating image defects such as fogging.

Thus, when employing the jumping development, a toner containing a magnetic material and a cylindrical development sleeve with a magnet disposed on its inner side are typically used so that the toner having no charges is retained on the development sleeve and prevented from jumping onto the photosensitive drum 21.

Embodiment 3

Embodiment 3 involves a structure in which a charging roller 223 and the photosensitive drum 21 are arranged not to contact each other. Since the structures other than the structure of the charging roller 223 are the same as those of embodiment 1, the detailed descriptions therefor are omitted.

Figure 9:
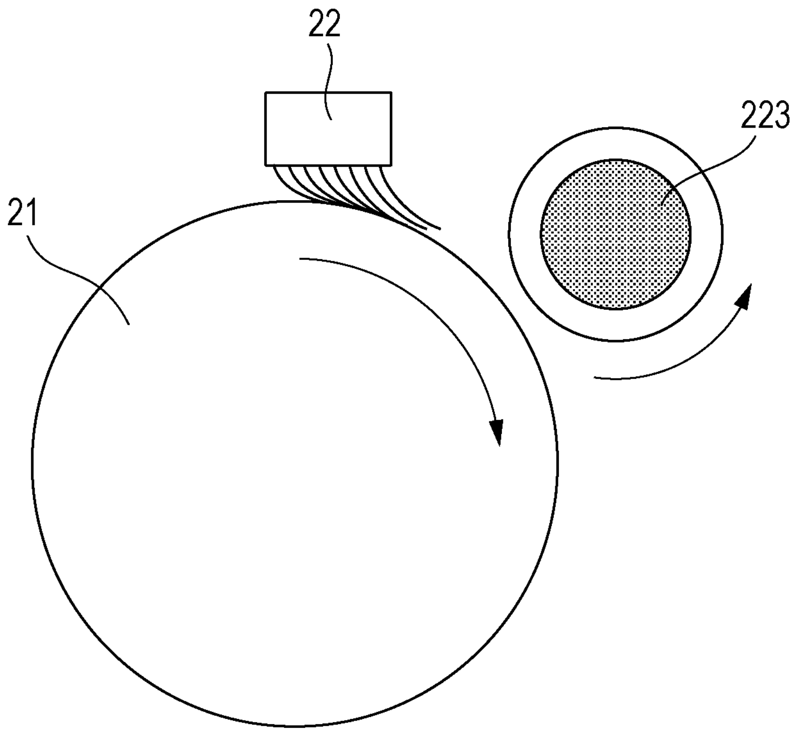
FIG. 9 illustrates another structural example of a charging roller according to embodiment 3.

As illustrated in FIG. 9, in this embodiment, the charging roller 223 is disposed downstream of the charging brush 22 in the rotation direction of the photosensitive drum 21. In this embodiment, unlike embodiment 1, the separation distance between the photosensitive drum 21 and the charging roller 223 is regulated by, for example, using rollers at two end portions of the charging roller 223 so that a particular gap is maintained between the surfaces of the photosensitive drum 21 and the charging roller 223. The separation distance is preferably a distance with which discharging occurs stably, and is preferably 10 μm to 100 μm. In this embodiment, the separation distance was set to 30 μm.

Discharging according to the Paschen's law is possible even when the photosensitive drum 21 and the charging roller 223 are separated, and thus, in this embodiment also, the surface of the photosensitive drum 21 can be uniformly charged by discharging.

Moreover, in this embodiment also, about 66% of the charge amount is charged by direct injection charging using the charging brush 22, and thus, the amount of discharge by the charging roller 223 can be reduced, and the discharge products and the deterioration of the surface of the photosensitive drum 21 can also be reduced.

In this embodiment, the charging roller 223 and the photosensitive drum 21 are not in contact with each other, and thus, irrespective of the structure of the charging roller 223, direct injection charging from the charging roller 223 to the photosensitive drum 21 does not occur. Thus, the image density variation caused by direct injection charging from the charging roller 223 to the photosensitive drum 21 such as the one described in embodiment 1 does not occur. Therefore, the volume resistivity of the outermost surface of the charging roller 223 and the shape thereof can be more freely selected.

Although a so-called cleaner-less structure that recovers the transfer residual toner in the development device 30 and reuses the toner is employed in this embodiment, since the charging roller 223 and the photosensitive drum 21 do not make contact, for example, discharge failure caused by the transfer residual toner attaching to the charging roller 223 can also be reduced.

In this embodiment, the charging roller 223 is described as an example of the non-contact charging member, but this feature is not limiting as long as uniform charging can be achieved. For example, a metal wire such as tungsten may be installed and used for discharging to charge the photosensitive drum 21. Alternatively, a higher voltage may be applied to the charging member 223 to dissociate and ionize molecules in the air to thereby charge the photosensitive drum 21. In either case, the amount of the discharge products generated by discharging and ionization and the amount of deterioration of the photosensitive drum 21 can be reduced by direct injection charging of the photosensitive drum 21 by the charging brush 22. According to a structure in which a metal wire or the like is used to dissociate and ionize the molecules in the air, the discharge products may attach to the metal wire side and uniform chargeability may be lost. In this event, as is already known, the problem can be addressed by installing a cleaning member with which the user can regularly clean the wire with a sponge member or the like.

Embodiment 4

In embodiment 4, a longitudinal width of a charging region of the charging brush 22 disposed on the upstream side in the rotation direction of the photosensitive drum 21 is larger than a longitudinal width of a charging region of the charging roller 23 disposed on the downstream side. Since the relationship between the longitudinal widths of the constituent members is the only difference from embodiment 1, the detailed descriptions of other members are omitted.

Figure 10A:
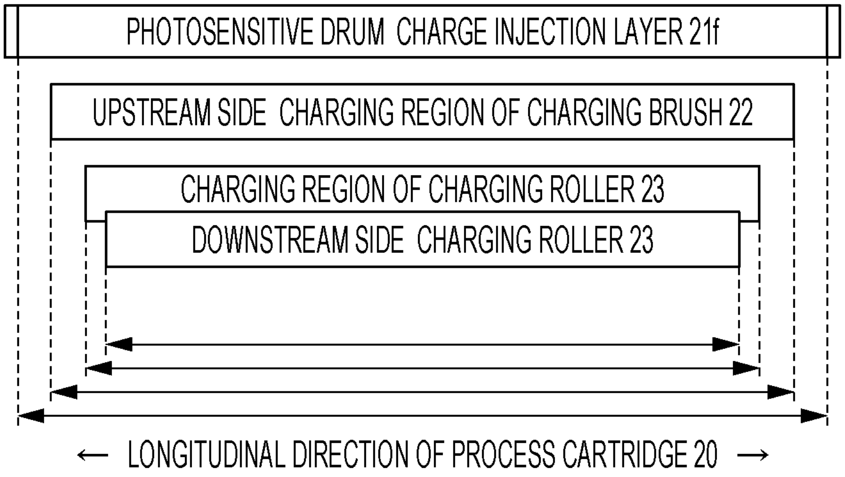
FIG. 10A is a relationship diagram of the longitudinal widths of constituent members according to embodiment 4.
Figure 10B:
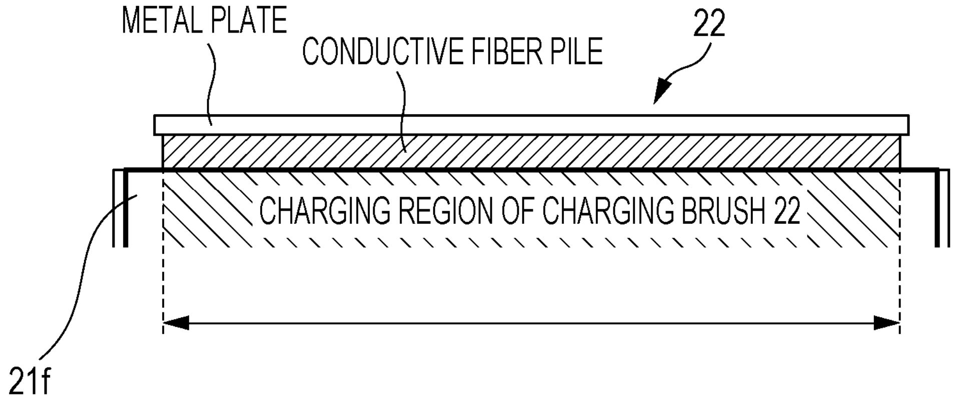
FIG. 10B is a relationship diagram of the longitudinal widths of constituent members according to embodiment 4.
Figure 10C:
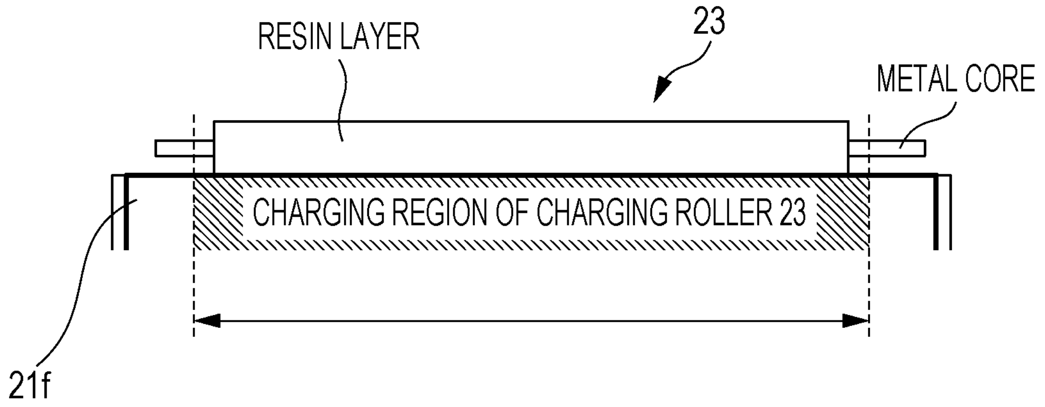
FIG. 10C is a relationship diagram of the longitudinal widths of constituent members according to embodiment 4.

As illustrated in FIG. 10A, in this embodiment, the longitudinal width of the charge injection layer 21*f* of the photosensitive drum and the longitudinal width of the charging region of the charging brush 22 are arranged to be larger than the longitudinal width of the charging region of the charging roller 23. Here, as illustrated in FIG. 10B, the charging region of the charging brush 22 is the region where the charging brush 22 charges the photosensitive drum 21 mainly by direct injection charging, and is the place where the conductive fiber piles of the charging brush 22 contact the photosensitive drum 21. As illustrated in FIG. 10C, the charging region of the charging roller 23 is the region where the charging roller 23 charges the photosensitive drum 21 mainly by discharging. In other words, it is the region where the photosensitive drum 21 is charged by discharging from the resin layer surface of the charging roller 23 and discharging from the resin layer side surfaces of the charging roller 23 described below.

Discharging according to the Paschen's law occurs not only from the surface of the resin layer of the charging roller 23 but also from the side surfaces. The width of the surface of the photosensitive drum 21 that can be charged by the discharging from the side surfaces is about 500 μm per side in the longitudinal outward direction from the edge of the resin layer of the charging roller 23, and the region charged by the charging roller 23 becomes longer than the longitudinal width of the resin layer of the charging roller 23. Thus, the longitudinal width of the charging brush 22 is preferably 1 mm or more longer than the longitudinal width of the resin layer of the charging roller 23. In this embodiment, the longitudinal width of the resin layer of the charging roller 23 was set to 229.8 mm, and the assembly tolerances of the charging roller 23 and the charging brush 22 including the component tolerances were respectively set to ±2 mm and ±2.5 mm. Here, the longitudinal width of the charging brush 22 was set to 235.3 mm so that the longitudinal width of the charging brush 22 was 1 mm longer than the longitudinal width of the resin layer of the charging roller 23.

According to this structure, discharging by the charging roller 23 occurs within the range where direct injection charging was carried out by the charging brush 22, and thus the discharge amount by the charging roller 23 can be reduced, and the surface deterioration of the photosensitive drum 21 caused by discharging at the end portions can be reduced.

As described above, according to the present invention, charging nonuniformity can be reduced while reducing generation of discharge products and modification of the photosensitive drum surface caused by discharging in a charging structure that involves direct charge injection into the surface of the photosensitive drum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:

a photosensitive drum that is rotatable and includes a support and a surface layer constituting a surface of the photosensitive drum;

a first charging member configured to form a first charging portion by coming into contact with the surface of the photosensitive drum and to charge the surface of the photosensitive drum in the first charging portion;

a development member configured to supply a developer to the surface of the photosensitive drum in a facing portion where the development member faces the surface of the photosensitive drum;

a second charging member configured to charge the surface of the photosensitive drum, which has been charged by the first charging member, in a second charging portion where the second charging member faces the surface of the photosensitive drum, wherein the second charging portion is located downstream of the first charging portion and upstream of the facing portion in a rotation direction of the photosensitive drum;

a first charging voltage applying unit configured to apply a first charging voltage to the first charging member;

a second charging voltage applying unit configured to apply a second charging voltage to the second charging member; and a control unit configured to control the first charging voltage applying unit and the second charging voltage applying unit, wherein the surface layer of the photosensitive drum has a volume resistivity of $1.0\times10^{9}$ ohm centimeters (Ω·cm) or more and $1.0\times10^{14}$ Ω·cm or less, and, in the second charging voltage applying unit applying the second charging voltage, the control unit controls the second charging voltage applying unit such that a second potential difference formed between the second charging member and the surface of the photosensitive drum charged by the first charging member is equal to or higher than a discharge starting voltage.

2. The image forming apparatus according to claim 1, wherein the first charging member has a form of a fixed brush.

3. The image forming apparatus according to claim 1, wherein the first charging member has a form of a brush roller.

4. The image forming apparatus according to claim 1, wherein the first charging member has electrical conductivity.

5. The image forming apparatus according to claim 1, wherein the first charging member has a resistance value of $1.0\times10^{4}$ ohms (Ω) or more and $1.0\times10^{8}$Ω or less.

6. The image forming apparatus according to claim 1, wherein the control unit is configured to execute control such that the first charging voltage has an absolute value smaller than a surface potential of the photosensitive drum formed after the photosensitive drum is charged by the second charging voltage.

7. The image forming apparatus according to claim 1, wherein the control unit is configured to control the first charging voltage such that a first potential difference formed between the surface of the photosensitive drum and the first charging member is smaller than the discharge starting voltage.

8. The image forming apparatus according to claim 1, wherein the control unit is configured to execute control such that a charging current flowing in the first charging member is 30% or more of a total value of charging currents flowing in the first charging member and the second charging member.

9. The image forming apparatus according to claim 1, wherein the second charging member has a form of a roller.

10. The image forming apparatus according to claim 1, wherein an outermost surface of the second charging member has a volume resistivity of $1.0\times10^{12}$ Ω·cm or more.

11. The image forming apparatus according to claim 1, wherein an outermost surface of the second charging member has a surface Ra of 0.5 to 3.0 micrometers (μm).

12. The image forming apparatus according to claim 1, wherein the second charging member is arranged not to contact the photosensitive drum.

13. The image forming apparatus according to claim 1, wherein the surface layer of the photosensitive drum is a charge injection layer.

14. The image forming apparatus according to claim 13, wherein the charge injection layer has a structure in which conductive particles are dispersed in a binder resin.

15. The image forming apparatus according to claim 13, wherein the charge injection layer is composed of amorphous silicon.

16. The image forming apparatus according to claim 1, further comprising a transfer member forming a transfer portion where the transfer member faces the photosensitive drum and is configured to transfer, in the transfer portion, a toner image from the photosensitive drum to a transfer-receiving body, wherein, after the toner image formed on the surface of the photosensitive drum is transferred in the transfer portion onto the transfer-receiving body, a toner remaining on the surface of the photosensitive drum is recovered by the development member.

17. The image forming apparatus according to claim 16, further comprising a cleaning blade configured to remove foreign matter on the photosensitive drum and to contact the surface of the photosensitive drum between a contact portion where the transfer member and the photosensitive drum contact each other and a contact portion where the first charging member and the photosensitive drum contact each other.

18. The image forming apparatus according to claim 1, wherein a width of a charging region of the first charging member in a longitudinal direction is larger than a width of a charging region of the second charging member in the longitudinal direction.

19. The image forming apparatus according to claim 1, wherein the photosensitive drum and the development member are arranged not to contact each other.

20. The image forming apparatus according to claim 1, wherein a voltage obtained by superimposing an alternating current (AC) voltage on a direct current (DC) voltage is applied to the development member, and the developer is developed as the AC voltage causes the developer of the development member to undergo reciprocal motions with respect to an image portion and a non-image portion on the photosensitive drum.

* * * * *